US006476796B1

(12) United States Patent
Kuzunuki et al.

(10) Patent No.: US 6,476,796 B1
(45) Date of Patent: Nov. 5, 2002

(54) DISPLAY DEVICE AND DISPLAY SYSTEM INCORPORATING SUCH A DEVICE

(75) Inventors: Soshiro Kuzunuki, Katsuta; Yasushi Fukunaga, Hitachi; Hiroshi Shojima, Hitachi; Masaki Miura, Hitachi; Toshimi Yokota, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/289,650

(22) Filed: Apr. 12, 1999

Related U.S. Application Data

(63) Continuation of application No. 08/460,927, filed on Jun. 5, 1995, now Pat. No. 5,917,475, which is a continuation of application No. 08/293,336, filed on Aug. 24, 1994, now abandoned, which is a continuation of application No. 07/999,653, filed on Dec. 30, 1992, now abandoned, which is a continuation of application No. 07/463,497, filed on Jan. 11, 1990, now abandoned.

(30) Foreign Application Priority Data

Jan. 18, 1989 (JP) .................................................. 1-7815

(51) Int. Cl.[7] ................................................ G09G 5/00
(52) U.S. Cl. ...................................................... 345/173
(58) Field of Search ................................. 345/156, 173, 345/179, 182, 104, 2, 3, 116, 115; 348/510, 589

(56) References Cited

U.S. PATENT DOCUMENTS

| 4,079,450 A | * | 3/1978 | Grimm et al. ............... 345/133 |
| 4,357,624 A | * | 11/1982 | Greenberg |
| 5,007,085 A | * | 4/1991 | Greanias et al. ............ 345/180 |

* cited by examiner

Primary Examiner—Chanh Nguyen
(74) Attorney, Agent, or Firm—Antonelli, Terry, Stout & Kraus, LLP

(57) ABSTRACT

A display device has a touch pad and a display lamintated together to form a screen, That screen is connected to a controller which processes signals generated by physical contact with the touch pad and activates the display to display e.g. characters input by a stylus to the touch pad. The display device is connected to an external device (e.g. a computer) and video signals from the external device are received via a video input and may be displayed on the display. Also the controller can transmit to the external device via an output. Thus, the display can display simultaneously information from the external device and information input to the touch pad. If the controller is arranged to carry out character recognition, the display device may then act as a hand-writing input device, with the handwritten information being incorporated with information in the external device and displayed.

3 Claims, 42 Drawing Sheets

WINDOW CODE

| bit | | | CONTENTS |
|---|---|---|---|
| 2 | 1 | 0 | |
| 0 | 0 | 0 | NOT DISPLAYED |
| 0 | 0 | 1 | WINDOW 1 |
| 0 | 1 | 0 | WINDOW 2 |
| 0 | 1 | 1 | WINDOW 3 |
| 1 | 0 | 0 | WINDOW 4 |
| 1 | 0 | 1 | DON'T CARE |
| 1 | 1 | 0 | DON'T CARE |
| 1 | 1 | 1 | DON'T CARE | i : VARIABLE OF SCREEN PRIORITY INDEX $PR_i$
$N(PR_i)$ : WINDOW NUMBER OF $PR_i$

DISPLAY DEVICE AND DISPLAY SYSTEM INCORPORATING SUCH A DEVICE

This application is a continuation application of U.S. Ser. No. 08/460,927, filed Jun. 5, 1995, now U.S. Pat. No. 5,917,475, which is a continuation application of U.S. Ser. No. 08/293,336, filed Aug. 24, 1994, now abandoned, which is a continuation application of U.S. Ser. No. 07/999,653, filed Dec. 30, 1992, now abandoned, which is a continuation application of U.S. Ser. No. 07/463,497, filed Jan. 11, 1990, now abandoned.

BACKGROUND OF THE INVENTION

1. Field of the Invention

The present invention relates to a display device for displaying information input thereto. It is particularly, but not exclusively, concerned with the recognition and display of hand written characters and figures.

2. Summary of the Prior Art

It is known to provide a device for recognising handwritten characters and figures, and inputting recognised characters to a computer system. For example, in U.S. Pat. No. 4,672,677 there is shown a character and figure processing apparatus in which characters are input via a suitable stylus to an input tablet, and that input tablet then transmits information concerning the character to a computer. That computer then recognises the character, and the character may then be displayed on the computer screen. Thus, in U.S. Pat. No. 4,672,677, the input table replaces the computer keyboard. A similar input tablet is shown in Japanese patent application laid-open number 58-144287.

In the above two disclosures, the processor and display for recognising the character, and the display screen for processing and displaying the character are the processor and the display of a standard computer. However, it is also known to combine the computer and display screen in a composite device. An example of this is shown in GB 2193827, in which an input screen and a display screen are bonded together and connected to a micro-computer. The input screen detects the physical contact of a stylus therewith, and generates information concerning the position of contact which is transmitted to the micro-computer. That micro-computer analyses the positional information to recognise the character being written on the input screen, and the recognised character is then transmitted to the display screen. The device shown in GB 2193827 may also have an output interface for connecting the display device to an external computer. Other examples of the integration together of a character input pad and a display screen are shown in e.g. U.S. Pat. No. 468,804, DE 351353, U.S. Pat. No. 4,641,354, and U.S. Pat. No. 4,639,720.

However, when such a display device is connected to an external computer, there are limitations on the performance thereof. With the arrangement of GB 2193827, information input to the input screen thereof can be readily transmitted to the external computer. However, it is not readily possible to transmit screen information from the computer to the display device, to enable the screen device to be used as a screen of an external computer. If a standard interface was used, such as an RS232C interface, then transmission of screen information from the external computer to the display device will be slow. An RS232C interface serially transmits coding data using a predetermined protocol. This protocol requires a large amount of time for transmission, and therefore it is not readily possible to use the screen of the display device as the screen of the computer.

It should also be mentioned that it is known from Japanese patent application laid-open number 63-1187887 to provide a display system which combines video information from a computer and from a separate display device. However, in that system, there is simply switching between the two types of inputs to the screen of the device, and that screen is a simple one, with the computer having its own separate input.

SUMMARY OF THE INVENTION

It has been appreciated, that since a standard computer produces a video signal for transmission to a standard screen (e.g. CRT, VDU. etc), transmission of information to form a display from an external computer to a display device may be facilitated if the display device has an input for receiving a video signal from the external computer. The display device may then process that video input and display it on the screen.

The screen of the display device can then carry out two functions. It may carry out e.g. a character input function by permitting suitable contact of the input of the screen, for example a touch pad mounted on the display of the screen to generate a display, but the screen may also display information from an external computer.

Furthermore, input to the display device e.g. from the touch pad may also be used to modify the display of the video information from the external computer. Thus, the display device may provide a text editing system in which text from an external computer is displayed on the screen of the display device, and then by providing a suitable input to a selected part of the screen, the text of that part may be edited, with the display device recognising the input corresponding to a particular editing operation.

If the display device also carries out the function of character recognition, it is then possible to amend the text by addition of further characters. However, the video input is preferably stored in a memory, as is information corresponding to the input to the display device. Then, that stored data may be combined by a suitable synthesis means to form a composite display on the screen of the display device from e.g. the touch pad. For example, a window may be created adjacent or overlapping the display of the video input from the external computer, and by providing a suitable input to the part of the touch pad corresponding to that window, the display of the video input may be changed.

Thus, when a display device according to the present invention is connected to an external computer, information from that external computer is synthesized and displayed on a screen of the display device, by suitable video interface means, and screen synthesis means. Thus, screen information from the display device itself, and screen information from the external computer may be superimposed, with the information from the two working environments shown in a one-plane display. When a user provides an input to the screen of the display device, suitable window management means detects and activates suitable screen processing means of the display device. For example, the display device may recognise characters input to the screen. Similarly, when the user generates screen information via the external computer, this may be detected and the screen of the display device activated. The display device may be connected to that external computer so that all information from the display device is passed to that external computer, so that application software in the external computer may be used in conjunction with the information from the display device.

It should also be noted that, for some purposes, the display device may be disconnectable from the external computer, in which case the display device operates as a simple hand-held device. Then, it is desirable that the display device has a suitable memory (which may be detachable) for storing information input thereto, so that that information may be transmitted to a suitable extent of the computer at an appropriate time, and then information transmitted from that external computer to the display device for generating a suitable display. Thus, the present invention may be used as a portable hand-writing input/output device, but may also be used in conjunction with an external computer for e.g. business use.

BRIEF DESCRIPTION OF THE DRAWINGS

Embodiments of the present invention will now be described, by way of example with reference to the accompanying drawings, in winch.

DETAILED DESCRIPTION

A first embodiment of the present invention will now be described with reference to FIGS. 1 to 45.

Figure 1:
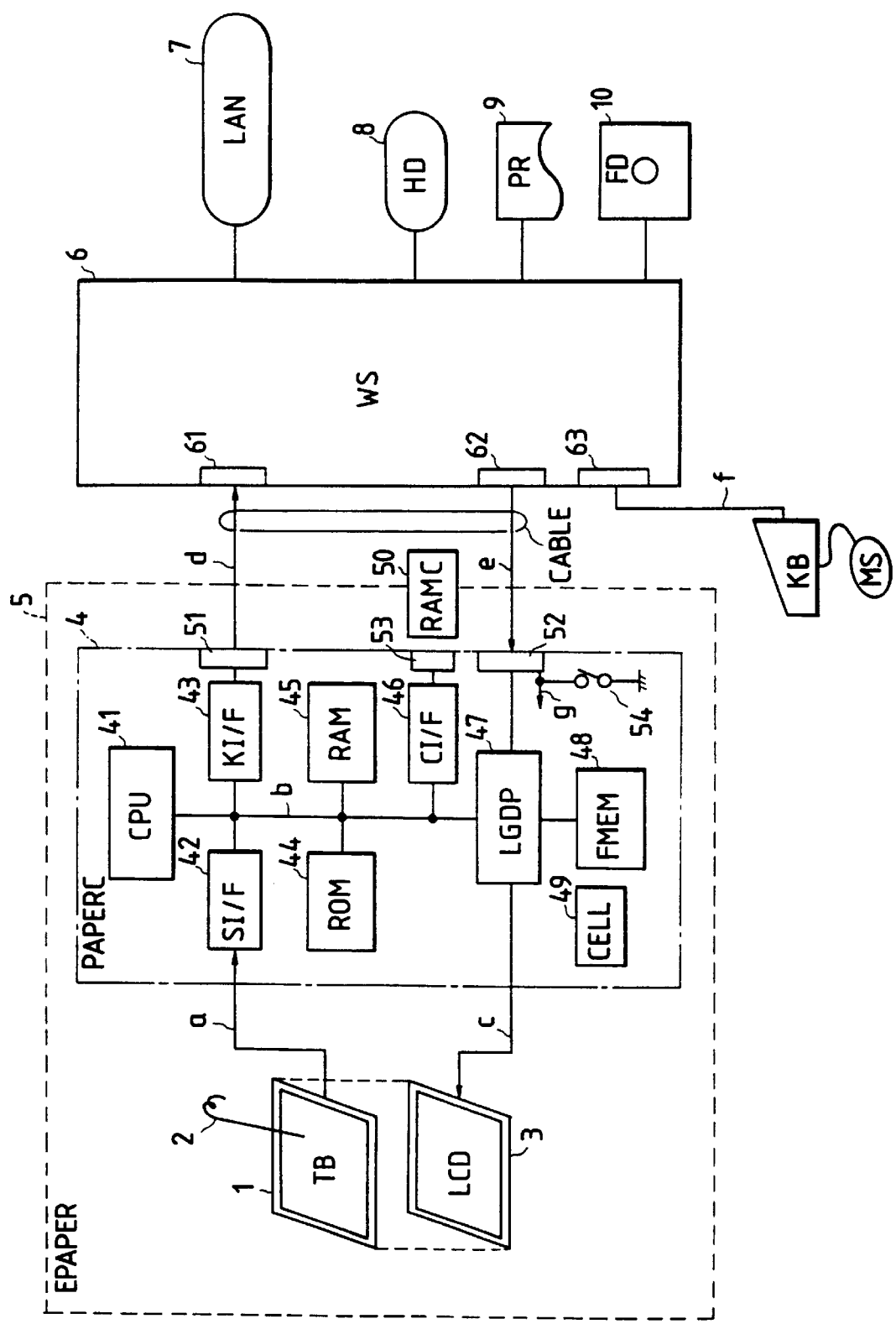
FIG. 1 shows a display device being a first embodiment of the present invention connected to an external computer.

FIG. 1 shows a general block diagram of a display device according to the present invention connected to an external computer. A transparent table (TB) forms a touch pad 1, which may be contacted by a stylus 2 to provide an input to that touch pad 1. Mounted directly below that touch pad 1 is a plane-type liquid crystal display (LCD) 3, on which signals may be displayed. The touch pad 1 and the display 3 are connected to a controller (PAPERC) 4. The controller 4, the touch pad 1, and the liquid crystal display are interconnected so as to form a display device 5. That display device 5 is connected to an external computer 6. The display device 5 may be considered as an electronic paper system, and such an electronic paper system will be abbreviated to EPAPER.

As illustrated in FIG. 1, the external computer 6 may be a work station connected to further external devices such as local area network (LAN) 7, auxiliary memory devices, e.g, hard disk 8 and floppy disk 10, and to a printer 9.

The display device 5 and the external computer 6 are connected to each other via code interface terminals 51 and 61, which terminals 51, 61, are interconnected by signal line d and also by video interface terminals, 52, 62, which terminals 52 and 62 are connected together by signal line e. The signal lines d and e may form a single cable. Also, as shown in FIG. 1, the external computer 6 may be connected via an interface terminal 63 and an interface line f to a keyboard (KB) and a mouse (MS).

The controller 4 has a processor (CPU) 41 which controls the operation of the display device. Signals from the touch pad 1 are transmitted via signal line a to a serial interface circuit (SI/F), and similarly a code interface circuit (KI/F) 43 is connected to the code interface terminal 51 for transmission of code information to the external computer 6. A memory (ROM) 44 stores programs and a memory recognition dictionary. A further memory (RAM) 45 may act as a working memory. The code interface circuit 42, the code interface circuit 43, and the memories 44 and 45 being connected to the processor 41 by a suitable signal line b.

That signal line b may also be connected to a card interface circuit (CI/F) 46, which is connected to a detachable memory card (RAMC) 50 in which data from the touch pad 1 may be stored. The detachable memory card 50 is inserted into a connecting terminal 53.

The video interface terminal 52 is connected to a screen synthesis circuit (LGDP) 47 which synthesises video signals and transmits them via signal line c to the liquid crystal display line 3. The video signals from the screen synthesis circuit may also be stored in a frame memory (FMEM) 48.

It can be seen that the screen synthesis circuit 47 is also connected to the processor 41 via line b, so that information from the processor 41 may be displayed on the display 3 as will subsequently be described.

FIG. 1 also shows a power source 49 for the display device 5, and also a switch 54 which is triggered when the video interface terminal 52 is connected to the external computer, which switch 54 initialises the display device 5.

The operation of the display device 5 shown in FIG. 1 will now be described.

First a video signal is inputted to the screen synthesis Circuit 4 through the line e and terminal 52. Then this data is written in the frame memory 48 as screen data.

The start of the input of the video signal via line e is detected by the switch 54, and the switch generates a detection signal which is transmitted via line g to the processor 41, whereby the timing of opening a window (to be described later) is determined. Further screen data of the display device 5 is processed by the processor 41, using memories 44 and 45, and written into the frame memory 48 from the screen synthesis circuit 47. The screen data stored in the frame memory 48 (both from the external computer 6 and the processor 41) are synthesised with each other by the screen synthesis circuit 47 and displayed on the display 3.

When the user inputs a stroke to the tablet 1, using the stylus 2, a signal of the stroke is transferred to the processor 41 through the interface circuit 42. The processor 41 discriminates whether the inputted signal is caused by the display device 5 (internal) or the external computer 6 (external). When the signal is internal, suitable software of the controller 4 is activated and only the result thereof is outputted to the external computer 6 through the code interface 43. On the other hand, when the inputted signal is an external signal, i.e., screen data inputted through a video interface (described later), the processor identifies this and transfers its operation data to the external computer 6 through the code interface 43 with that data being processed by the external computer with the data being processed by the external computer.

Figure 2A:
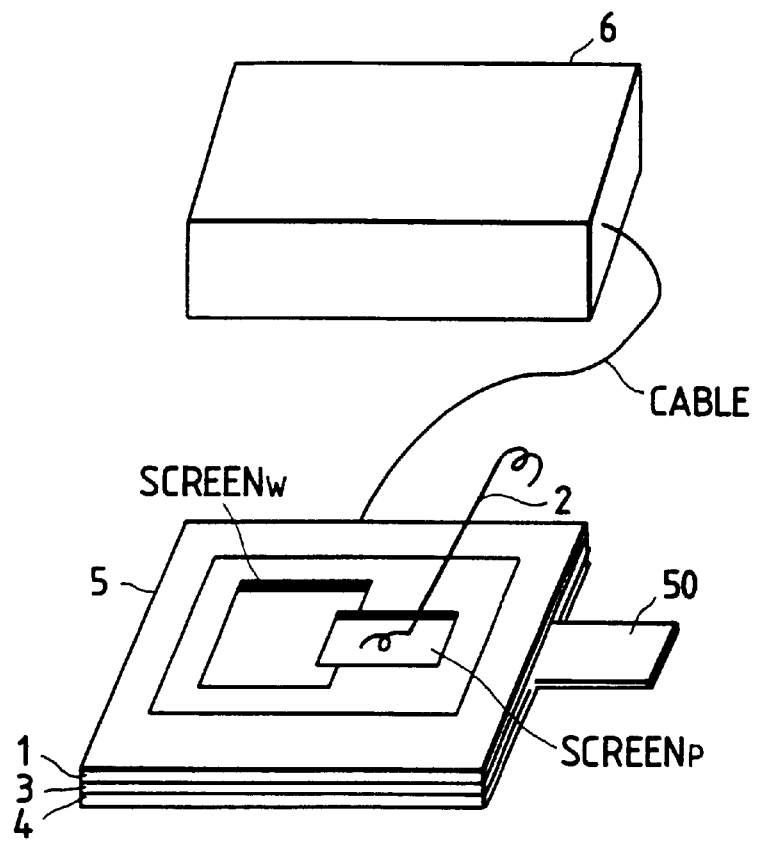
FIGS. 2a and 2b show two alternative uses of the display device according to the present invention, with FIG. 2a being the arrangement shown in FIG. 1 and FIG. 2b showing a display device used independently.
Figure 2B:
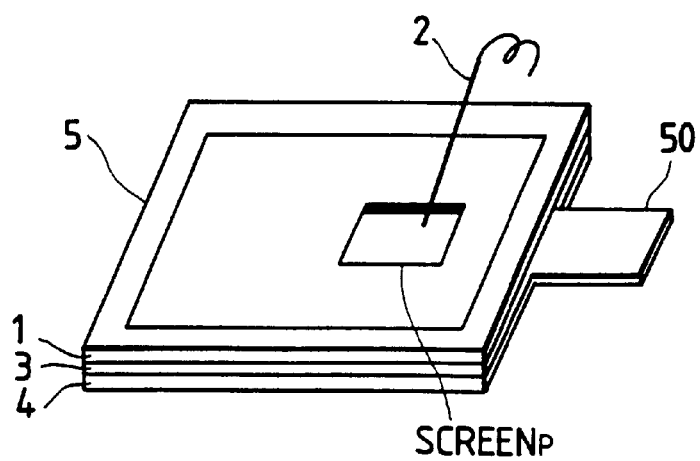

FIGS. 2a and 2b illustrate two examples of the use of the display device. FIG. 2a shows the external computer 6 connected to the display device 5, and FIG. 2b shows the display device 5 being used on a stand-alone basis. Since, as described above, the touch pad 1, the display 3 and the controller 4 are connected together in an integral structure, the operation described above is similar to writing on a sheet of paper with a pencil.

In FIG. 2a, two display parts SCREENp and SCREENw, being displays of information from the display device, and the external computer 6 respectively, are synthesized and displayed. FIG. 2b shows that when the display 3 shows only one screen part SCREENp, being the screen part showing information from the display device 5.

As shown in FIGS. 2a and 2b, the display device 5 has a structure such that a removable memory card 50 can be inserted as an external file device.

Figure 3:
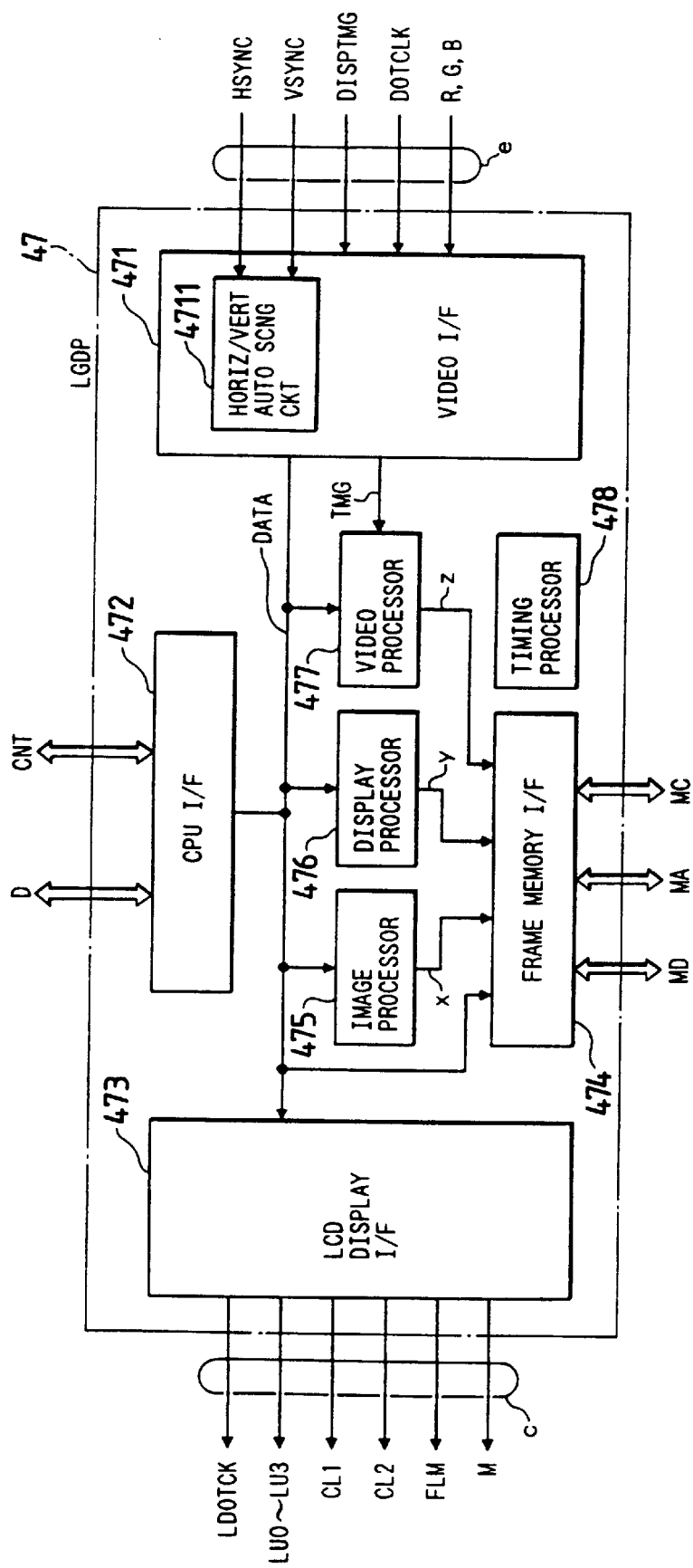
FIG. 3 shows the internal structure of the screen synthesis circuit of the embodiment of the present invention shown in FIG. 1.

FIG. 3 illustrates the internal structure of the screen synthesis circuit 47.

The screen synthesis circuit 47 has a video interface part 471, a CPU interface part 472, an LCD display interface part 73, a frame memory interface part 474, an image processor unit 475 for writing data (characters or patterns) of the display device 5 in the frame memory 48, a display processor unit 476 for synthesizing and displaying images in multi-window from, a video processor unit 477 for writing video signals inputted through the video interface part 471 in the frame memory 48, and a timing processor unit 478 which generates and controls the overall timing of the screen synthesis circuit 47.

The screen synthesis circuit 47 may be formed from a single chip by LSI. Alternatively, the functions of this circuit may be achieved using chips already available. For example, the chip HD66840ULVIC (LCD Video Interface Controller) made by Hitachi. Ltd. provides the following in one chip and is mainly used for lap-top personal computers:

(1) video interface part 471
(2) video procesosr unit 477
(3) display processor unit 476
(4) frame memory interface part 474
(5) LCD display interface part 473
(6) CPU interface part 472
(7) timing processor unit 478 Similarly, the chip HD64400GDP (Graphic Data processor), made by Hitachi, Ltd., provides the following in one chip and is mainly used in personal computers and work stations using a CRT:

(1) CUP interface part 472
(2) display processor unit 476
(3) image Processor interface part 475
(4) frame memory interface part 474
(5) CRT display interface part (not shown in FIG. 3)
(6) timing processor unit 478

Thus the screen synthesis circuit LGDP 47 of the present invention can be formed by combining relevant elements of the above-mentioned two chips.

Signals inputted to and outputted from the screen synthesis circuit 47 and busses connected thereto are as follows:

HSYNC horizontal synchronizing signal,
VSYNC vertical synchronizing signal,
DISPTMG display timing,
DOTCLK dot clock
R,G,B read, green and blue video signals,
LDOTCLK dot clock for a liquid crystal display,
LO to L3 display data for the lower half of a screen of a liquid crystal display
UO to U3 display data for the upper half of a screen of a liquid crystal display,
CL1, CL2 clock 1, clock 2,
FLM time-sharing control signal,
M alternating drive signal for a liquid crystal display,
D data bus
CNT control bus
MD data bus to a frame memory,
MA address bus to a frame memory, and
MC control bus to a frame memory.

Figure 4:
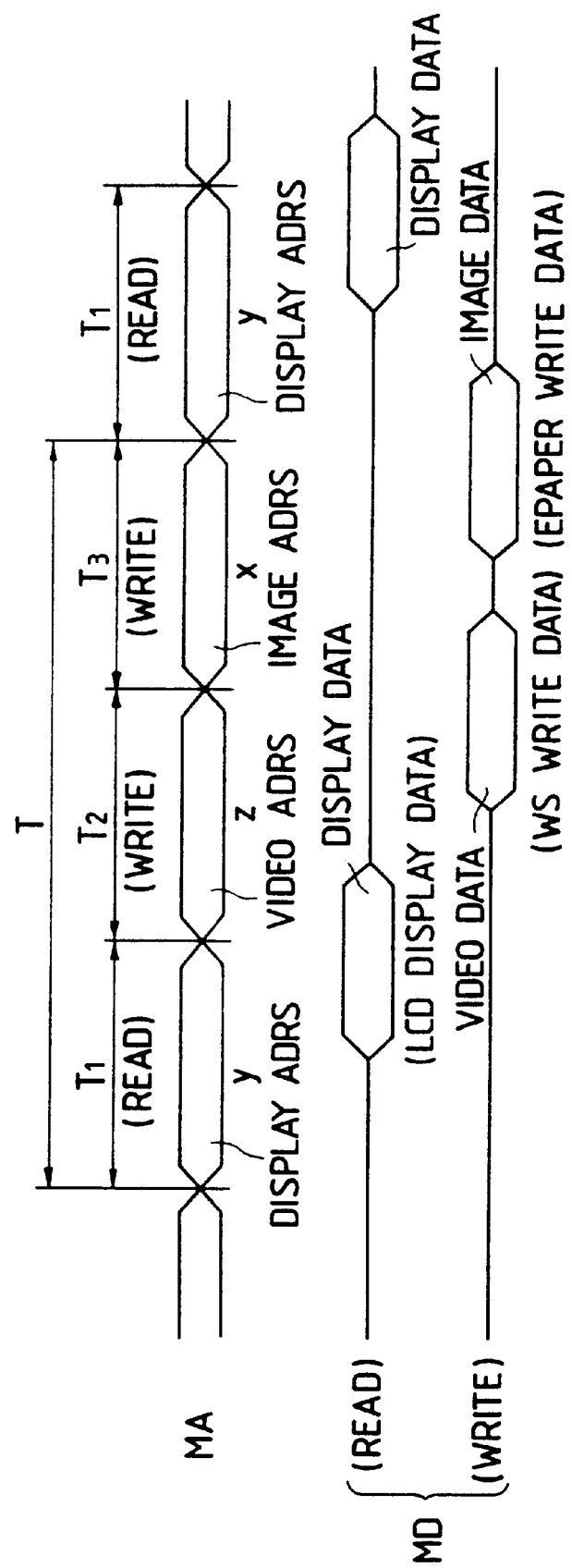
FIG. 4 illustrates the timing of operations within a part of the synthesis circuit of FIG. 3.
Figure 5:
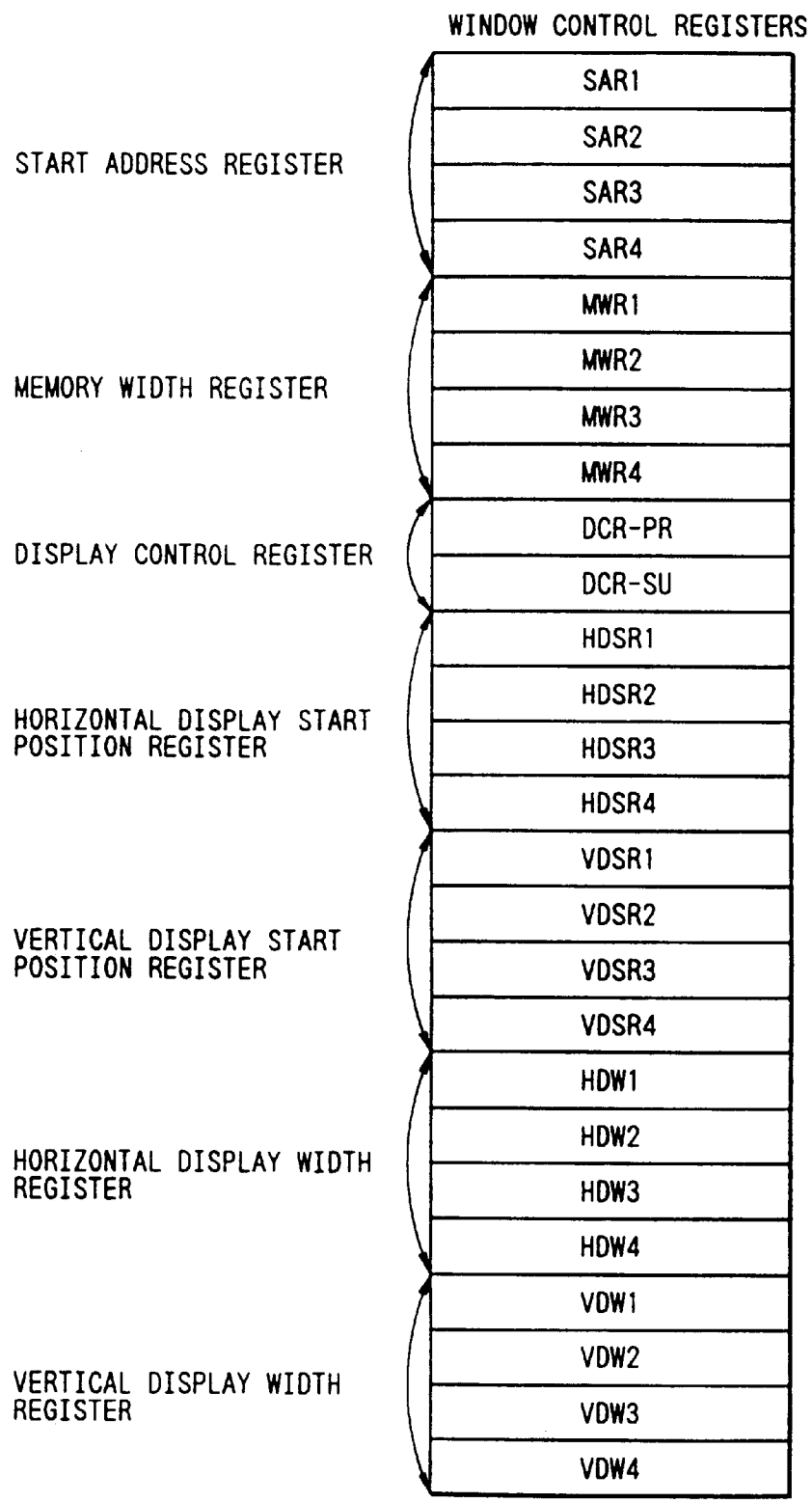
FIGS. 5 to 7 show internal registers within part of the synthesis circuit of FIG. 3.

FIG. 4 shows the timing of change over (x,y,z) of the frame memory interface part 474 in FIG. 3. A constant cycle T (about 1 sec.) is divided into three time slots T1,T2 and T3, and addresses are assigned to the respective time slots: i.e., the display address y of the display processor unit 476 to T1, the video address z of the video processor unit 477 to T2 and the image address of the image processor unit 475 to T3. In addition the slot T1 is a read cycle, and T2 and T3 are write cycles. Thus the slot T1 is a read cycle for reading out display data on the display 3, the slot T2 is a write cycle for writing video data from the external computer 6 into the frame memory 48, and the slot T3 is a write cycle, in which the display device , itself writes into the frame memory 48.

Referring next to FIGS. 5 to 8, internal registers in the display processor unit 476 of the screen synthesis circuit 47 and their operations will be discussed.

Figure 8:
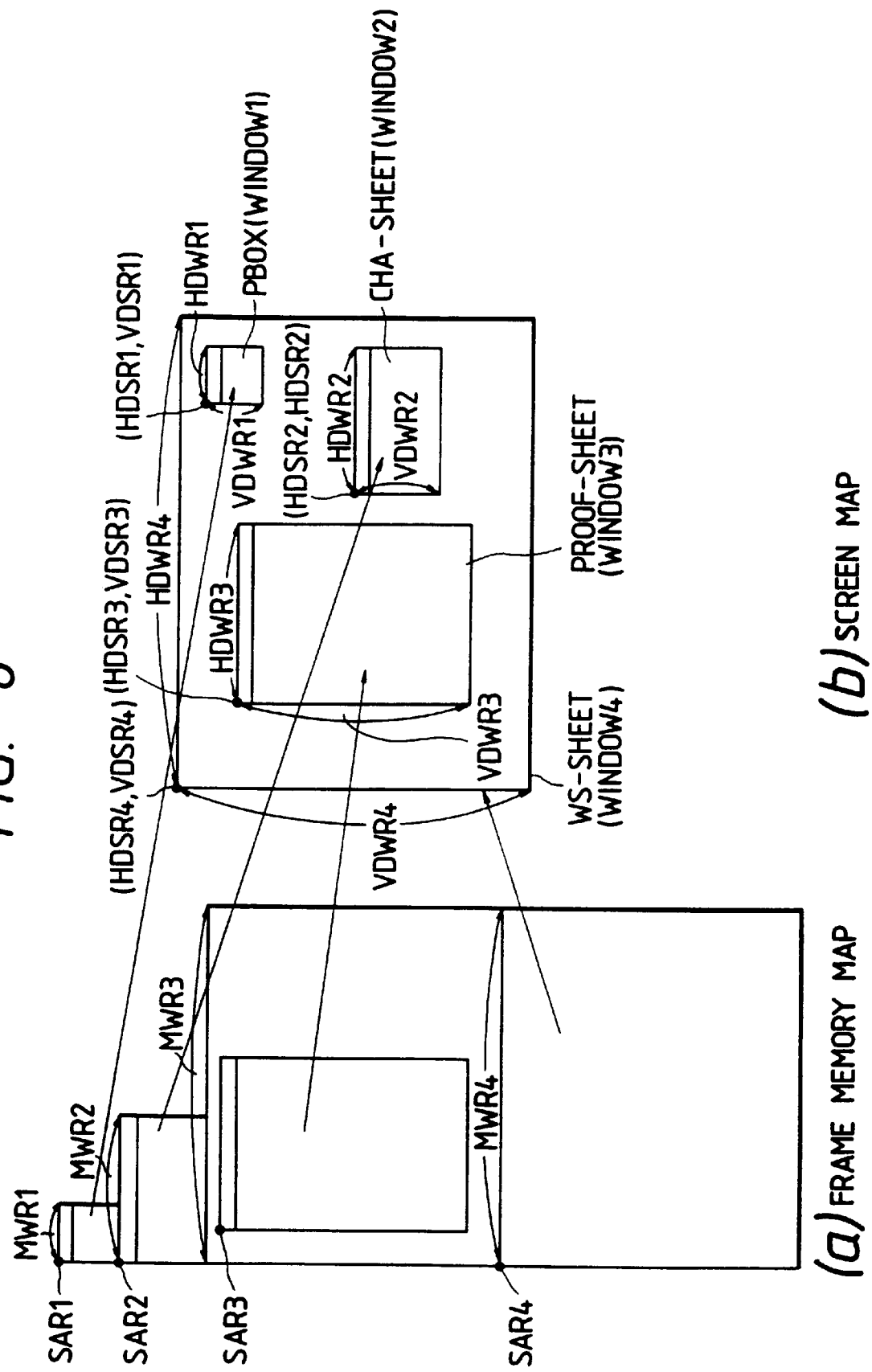
FIG. 8 illustrates the operation of the synthesis circuit of FIG. 3.

The screen synthesis circuit 47, as illustrated in FIG. 8, can synthesize and display four windows simultanously. When designated, one of the four windows can be made a Transparent window. Also, data to be displayed in the windows can be freely mapped in the frame memory 48, and a start address and a memory width can be defined for each window. This definition is carried out by start address registers (SAR1 to SAR4) and memory width registers (MWR1 to MWR4) in FIG. 5.

Screen data of each window can be mapped at optional locations on the plane display. This can be defined by horizontal/vertical display start position registers (HDSR1 to HDSR4/VDSR1 to VDSR4) and horizontal/vertical display width registers (HDW1 to HDW4/VDW1 to VDW4), as shown in FIG. 8.

There are display control registers DCR-PR and DCR-SU to define the priority levels of respective window screens or a synthesis display mode. Here, the term "priority level"

means the pattern for superimposition of a plurality of window screens; i.e., which window screen is to be displayed uppermost and which window screen is displayed thereunder, for example. The synthesis display mode also determines whether or not a certain window screen is to be made transparent. The contents of each display control register are shown in FIGS. 6 an 7.

Figure 6:
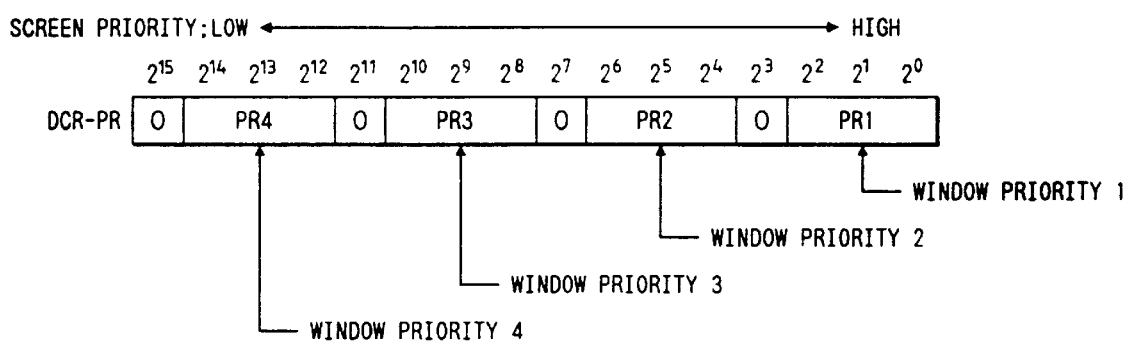

The display control register DCR-PR in FIG. 6 designates screen priorities, in which the window corresponding to the number set in PR1 has the highest priority level and a window corresponding to the number set in PR4 the lowest priority level. A window of the highest priority Level should not then overlap with any other part window.

Figure 7:
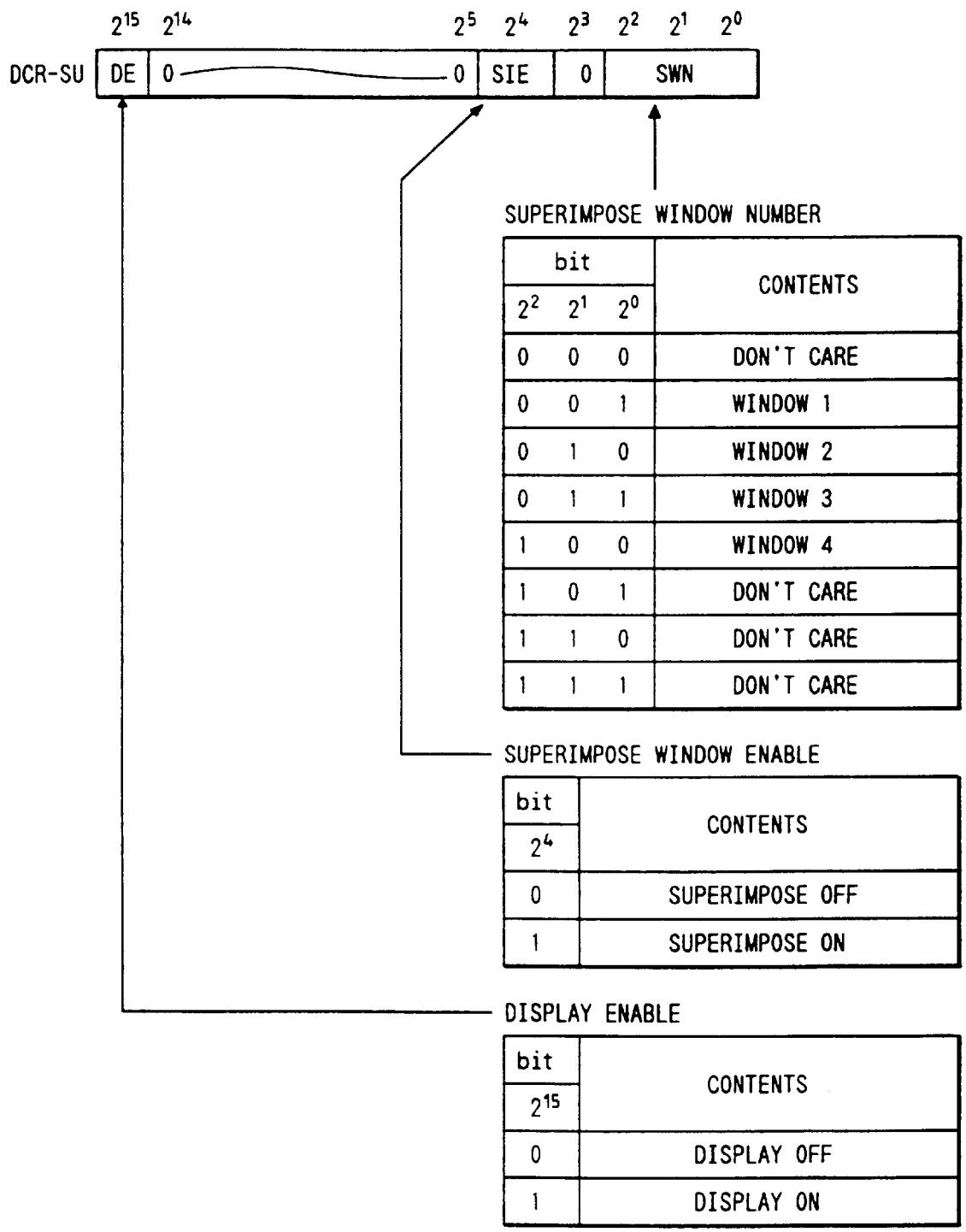

FIG. 7 shows a display control register DCR-SU for making one of four windows transparent. A window number is set in the area SWN, a superimpose ON or OFF signal in the area SIE and a display ON or OFF signal for all the windows in the area DE. In addition, there may be various control registers, although they are omitted in the figure.

As shown in FIG. 8, the following functions are now assigned to each window.
(1) window 1 . . . paper box PBOX; an icon screen of the display device 5,
(2) window 2 . . . character input sheet CHA-SHEET; a sheet for inputting handwritten characters and converting them into character codes,
(3) window 3 . . . proof symbol input sheet PROOF-SHEET; a sheet for directly editing characters or patterns by hand-writing, and
(4) window 4 . . . WS screen sheet WS-SHEET; a sheet for manipulating the screen of the external computer 6.

Of the windows above, the paper box PBOX of the window 1 is used for controlling the display device 5 as a whole, and in this embodiment, should be displayed at all times. The window 4 is initialized and automatically displayed when a video signal is inputted from the external computer. The detection signal g already described (cf. FIG. 1) is used for this.

The windows 2 and 3 are opened by manipulation of the paper box PBOX of the window . Further, if required, the windows 2 and 3 can also be used in order to display some other images than CHA-SHEET and PROOF-SHEET. For this purpose, when such a requirement is detected, the processor 41 creates information for displaying the image required by using the contents of the memories 44 and 45 and the memory area assigned to the windows 2 and 3 in the frame memory 48 is re-assigned to the displayed information forming the display.

Next, an outline of the manipulation and operation using these windows will be explained, referring to FIGS. 9 to 20.

Figure 9:
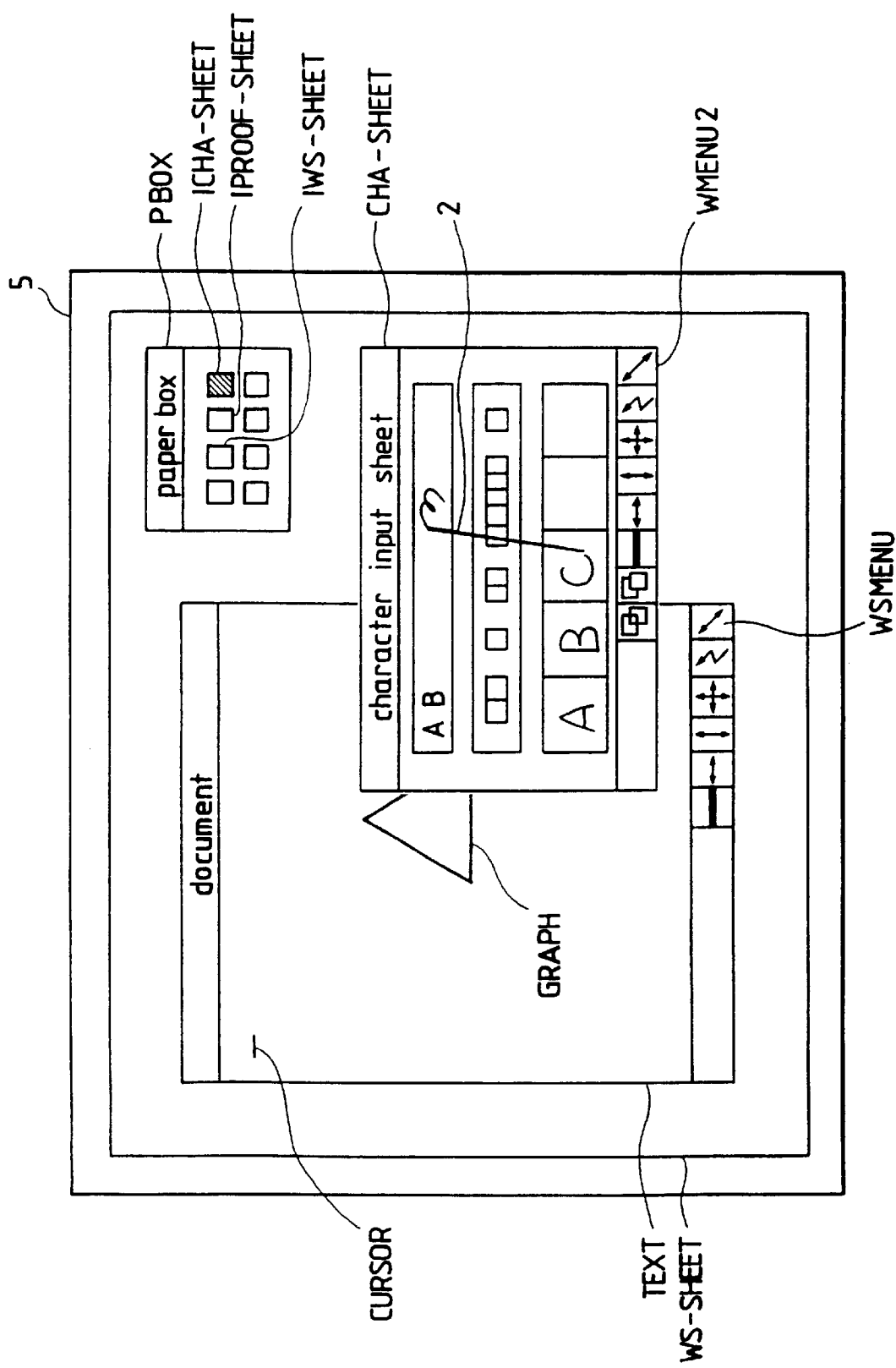
FIG. 9 shows a display on the screen of the display device of FIG. 1.

FIG. 9 shows a display in which a button for a character input sheet icon ICHA-SHEET in the paper box PBOX is clicked by a mouse, the character input sheet CHA-SHEET is opened and hand-written characters are input. On the display 3, the screen WS-SHEET is diplayed with only a document TEXT. In the TEXT, a cursor CURSOR and a figure GRAPH are already displayed.

A window menu (WMENU) is displayed at the bottom of the window with highest priority and is ready for window manipulation. In FIG. 9, the character input sheet CHA-SHEET has the highest priority and thus a window menu WMENU2 is displayed. Further, a window menu WSMENU of the work station is displayed as one of the screen data of the external computer 6. Since however, the window 4 for WS-SHEET has the lowest priority in this case, the WS-SHEET screen cannot be manipulated by using its window WSMENU, although it is displayed.

Figure 10:
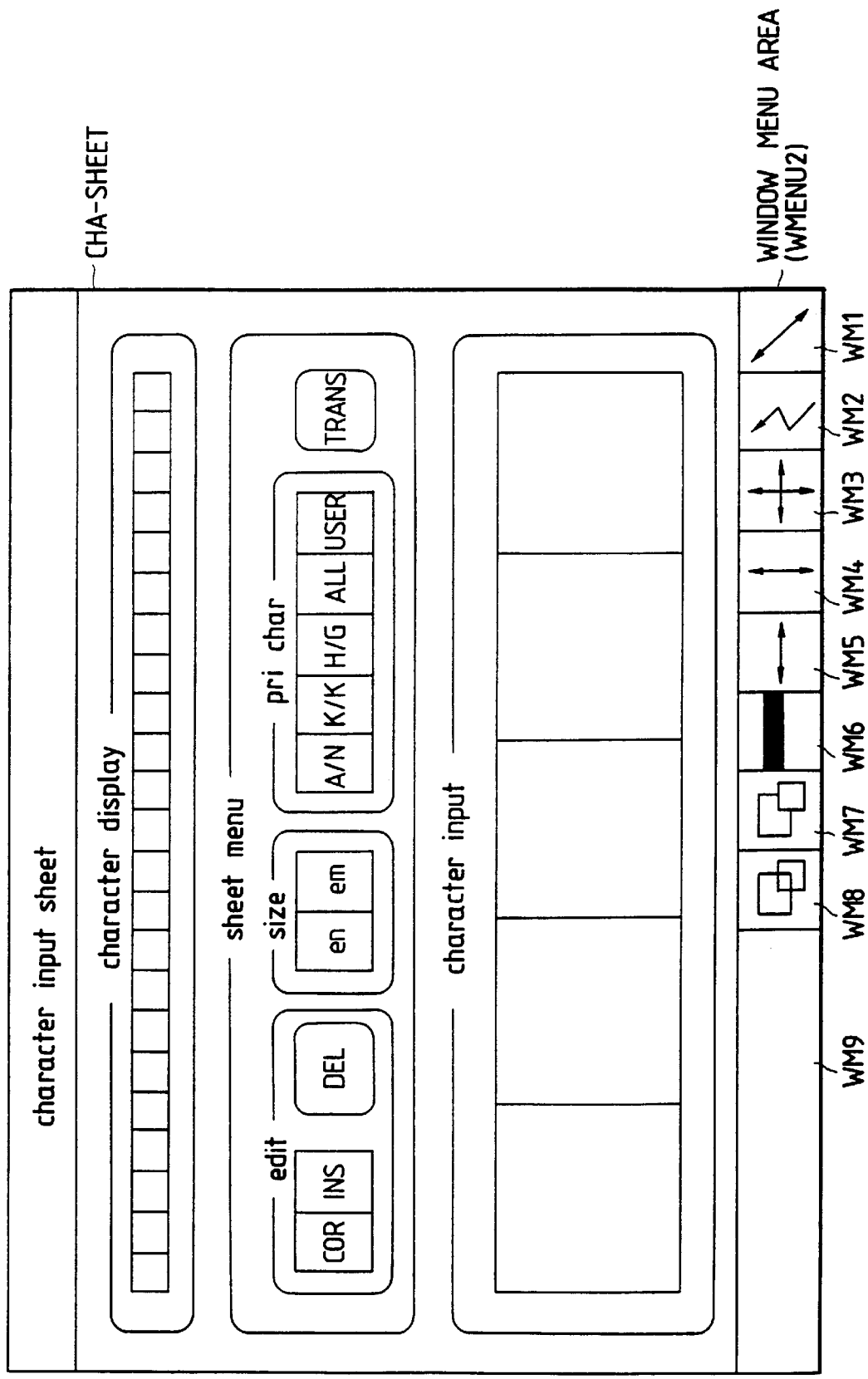
FIG. 10 shows a detail of the display shown in FIG. 9.

FIG. 10 shows a detailed screen layout of the character input sheet CHA-SHEET. The character input sheet CHA-SHEET is divided into:
(1) a character display area: an area to display a string of recognised characters. It is also used to specify the cursor while writing a string of characters or to display candidate characters at the time when recognition is incorrect;
(2) a sheet menu area: this menu includes a button to edit a string of characters (correction/insertion, deletion), a button to change character size (en/em), a button to specify the sort of characters to be recognised with priority (Alphanumeric characters, Katakana (Japanese square characters), Hiragana (Japanese cursive characters), every sort of character, User dictionary) and also a button to transfer a string of recognised characters to the external computer 6;
(3) a character input area: an area to input hand-written characters. The area in this example can contain five squares, in each of which one character may be written. When a stroke is inputted to one square, strokes inputted to a previous square are taken up and the character recognition starts with respect to those strokes.

Since the handwriting of recognised characters is subsequently erased, a user can write characters in the squares one after another.
(4) a window menu area: a menu to manipulate windows, including
  (i) WM1: a button to change the window size,
  (ii) WM2: a button to move the location of the window,
  (iii) WM3: a button to scroll up and down and right and left on the display,
  (iv) WM4: a button to scroll the display up and down,
  (v) WM5: a button to scroll the display right and left,
  (vi) WM6: a button to operate a file of a screen,
  (vii) WM7: a button to make a display nontransparent,
  (viii) WM8: a button to make a display transparent, and
  (xi) WM9: a button to lower the display priority level.

Figure 11:
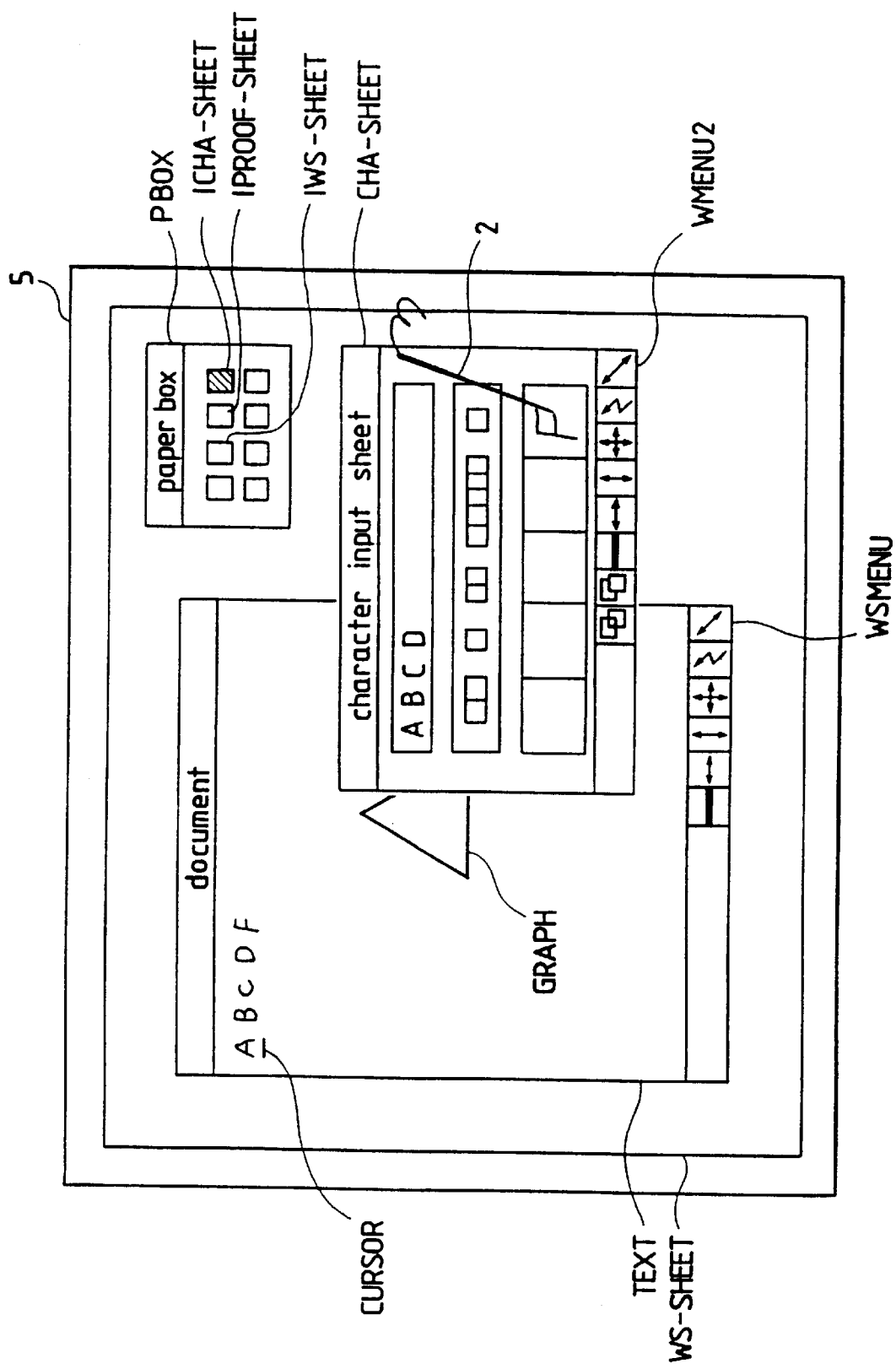
FIGS. 11 to 20 show further displays on the screen of the display device in FIG. 1.

FIG. 11 shows the case where the letters "ABCD" have been inputted one after another in the character input area of the character input sheet CHA-SHEET, and "E" is now being inputted by handwriting. Hand-written characters "ABCD" have already been recognised and are displayed in the character display area.

On the other hand, in the window of the document TEXT, in WS-SHEET, handwriting in the character input sheet in simultaneously displayed at or after the location of the cursor CURSOR. This indicates that hand-written characters are now being inputted through the character input sheet. However, the location of the cursor is not updated.

Figure 12:
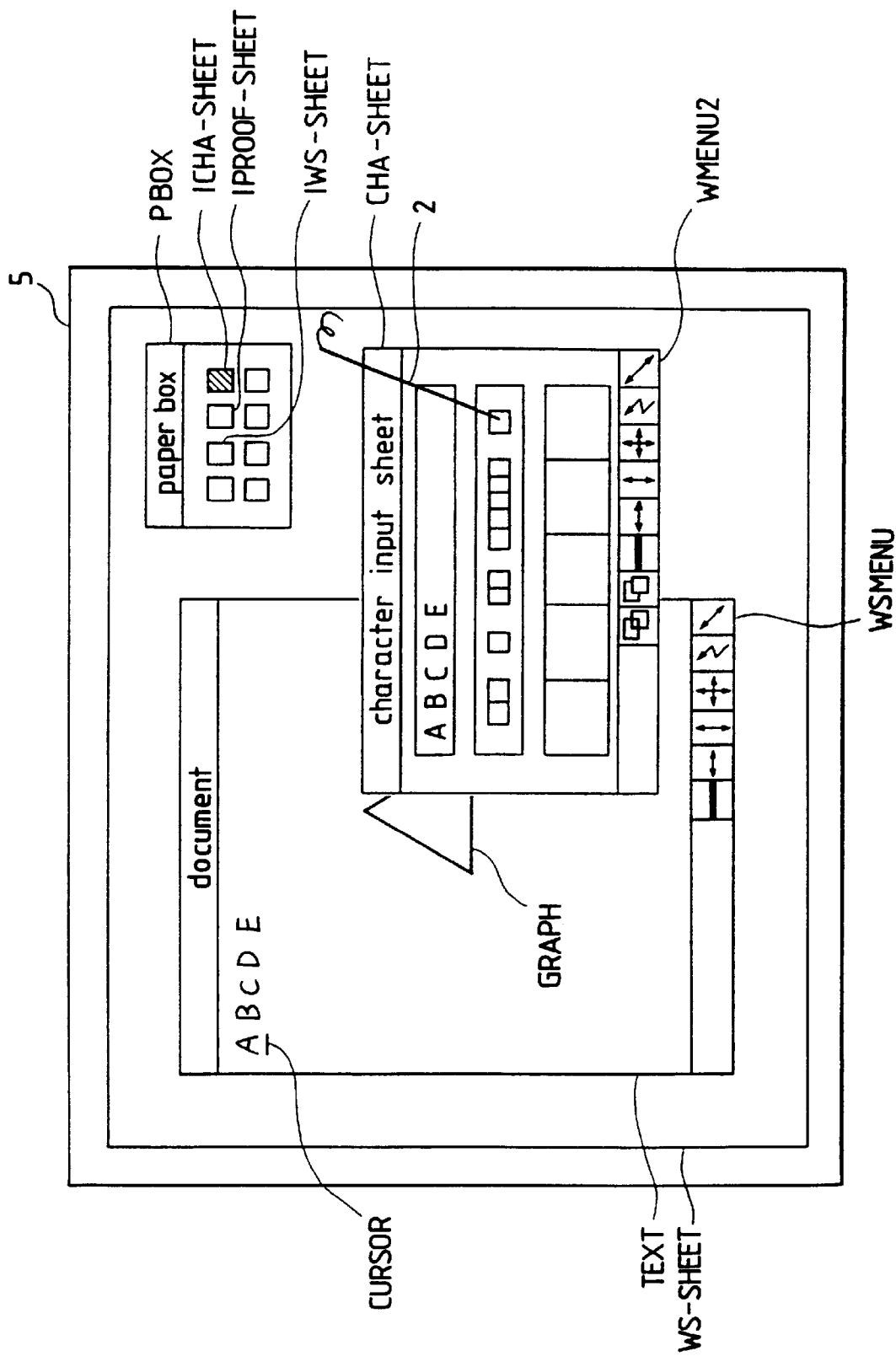

FIG. 12 shows that when all characters are inputted by handwriting, a button "transfer" in the sheet menu area of CHA-SHEET (cf. FIG. 10) is clicked to transfer the string of the characters "ABCDE" to the external computer 6. Then, the hand-written characters are displayed as "ABCDE" in the document TEXT.

Figure 13:
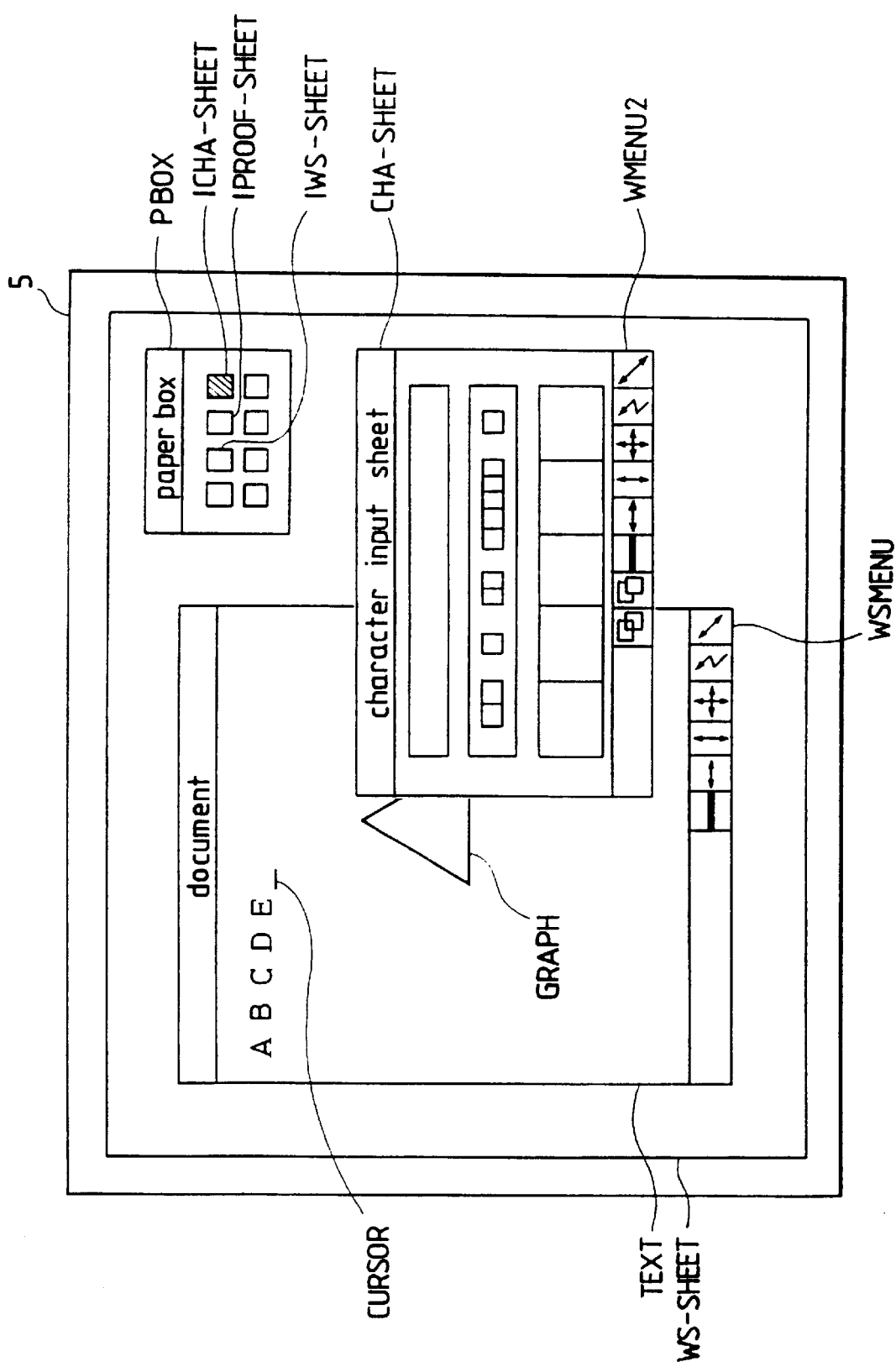

When the button "transfer" is clicked by the stylus 2, as shown in FIG. 12, the hand-written "ABCDE" characters displayed in the document TEXT of WS-SHEET are successively erased from the position of the cursor CURSOR and replaced one after another by correctly written characters, as shown in FIG. 13.

Further, it is possible to display handwriting by executing an exclusive OR (EOR) operation between a handwritten character and the then-present content of the frame memory 48 and again writing the result of EOR in the frame memory 8. Moreover, the handwriting can be deleted by executing the same EOR once again and writing the result thereof into the frame memory 48.

Figure 14:
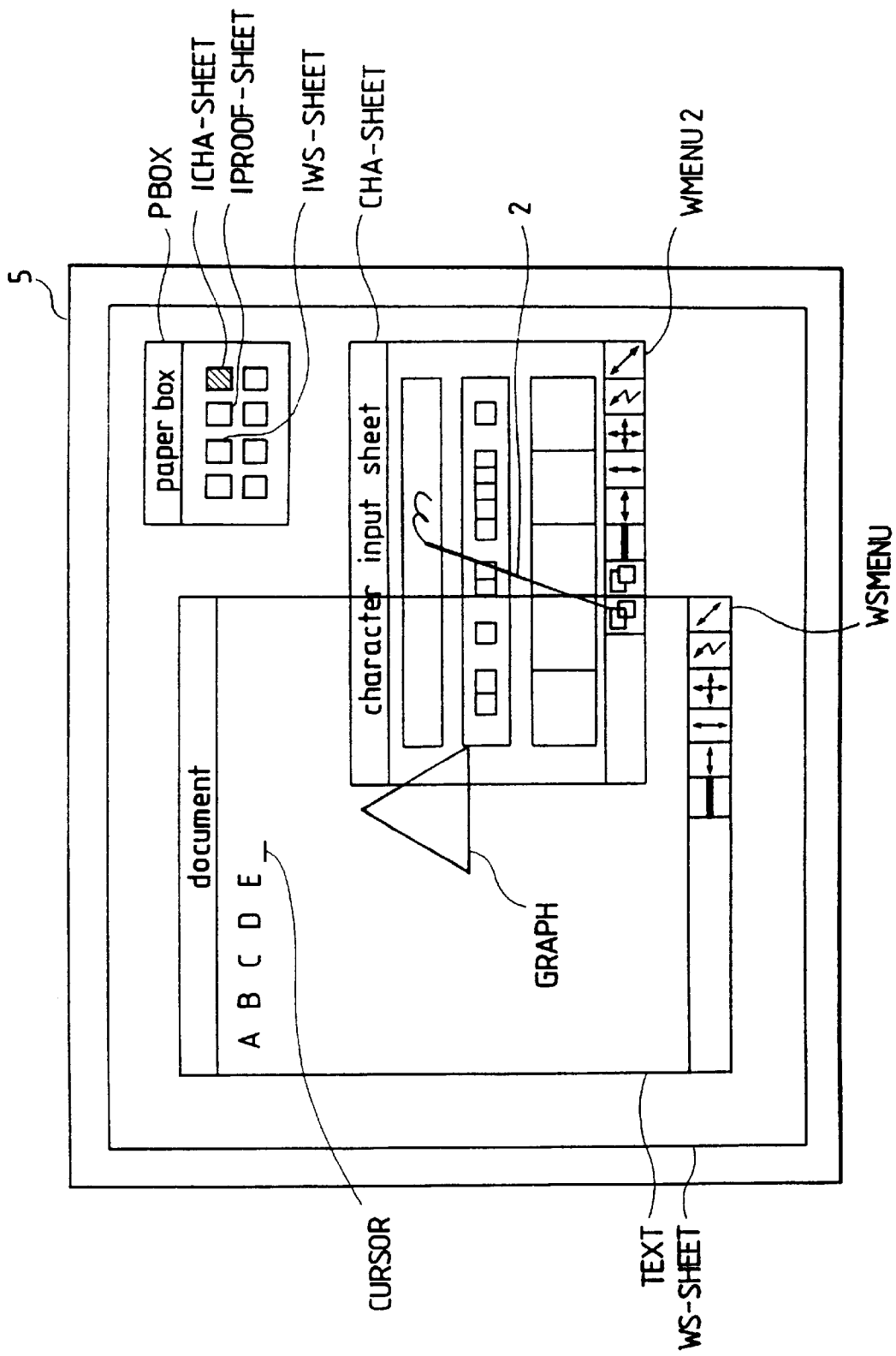

FIG. 14 shows that when the button WM8 is clicked, the character, input sheet CHA-SHEET becomes transparent and a part of a back screen (a part of GRAPH and a part of a frame of the document TEXT appears, underlaid).

Figure 15:
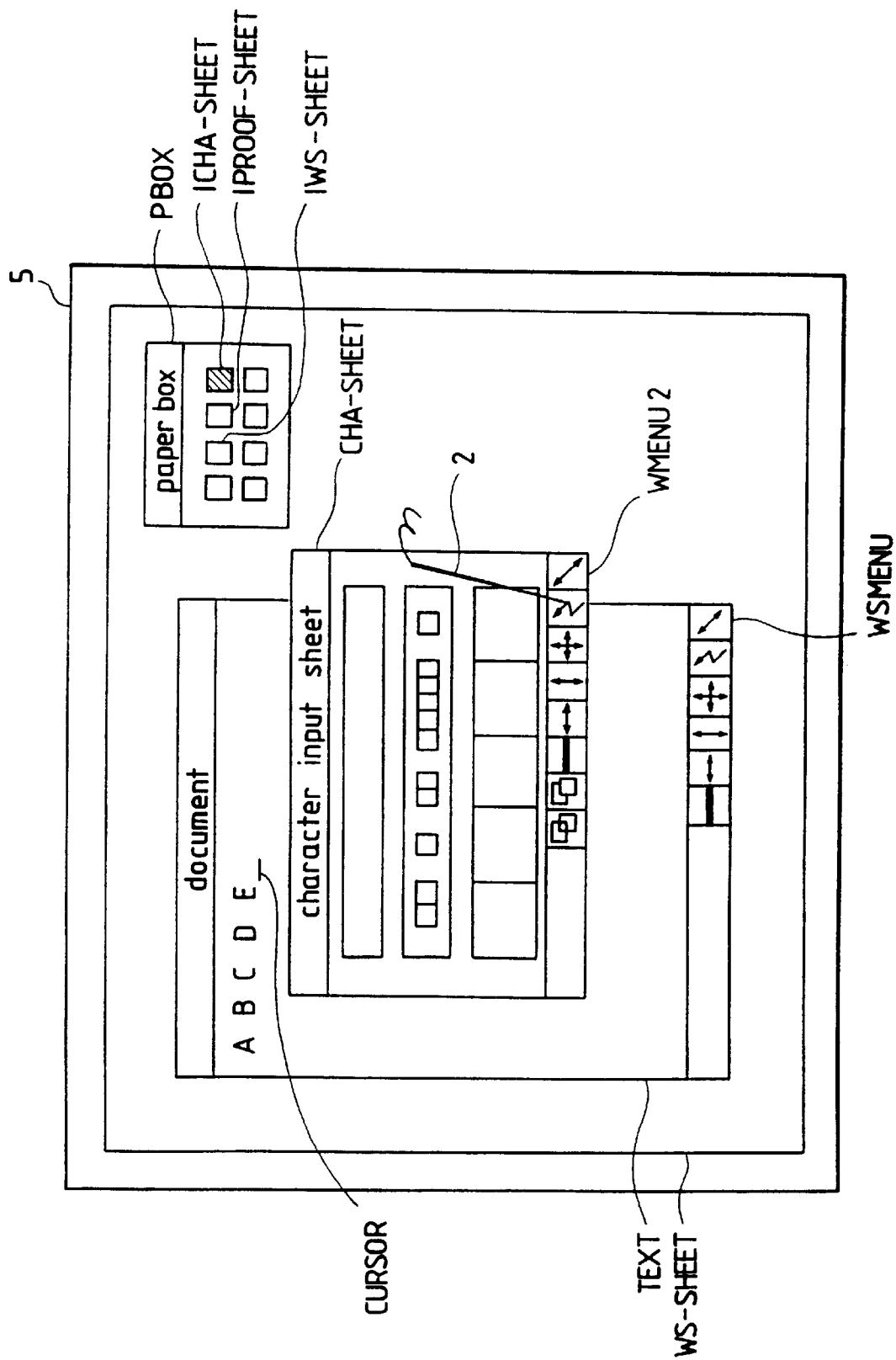

FIG. 15 shows that the button WM2 may be specified by the stylus 2 to move the window from CHA-SHEET toward the left. In this way, the window can be moved freely.

Figure 16:
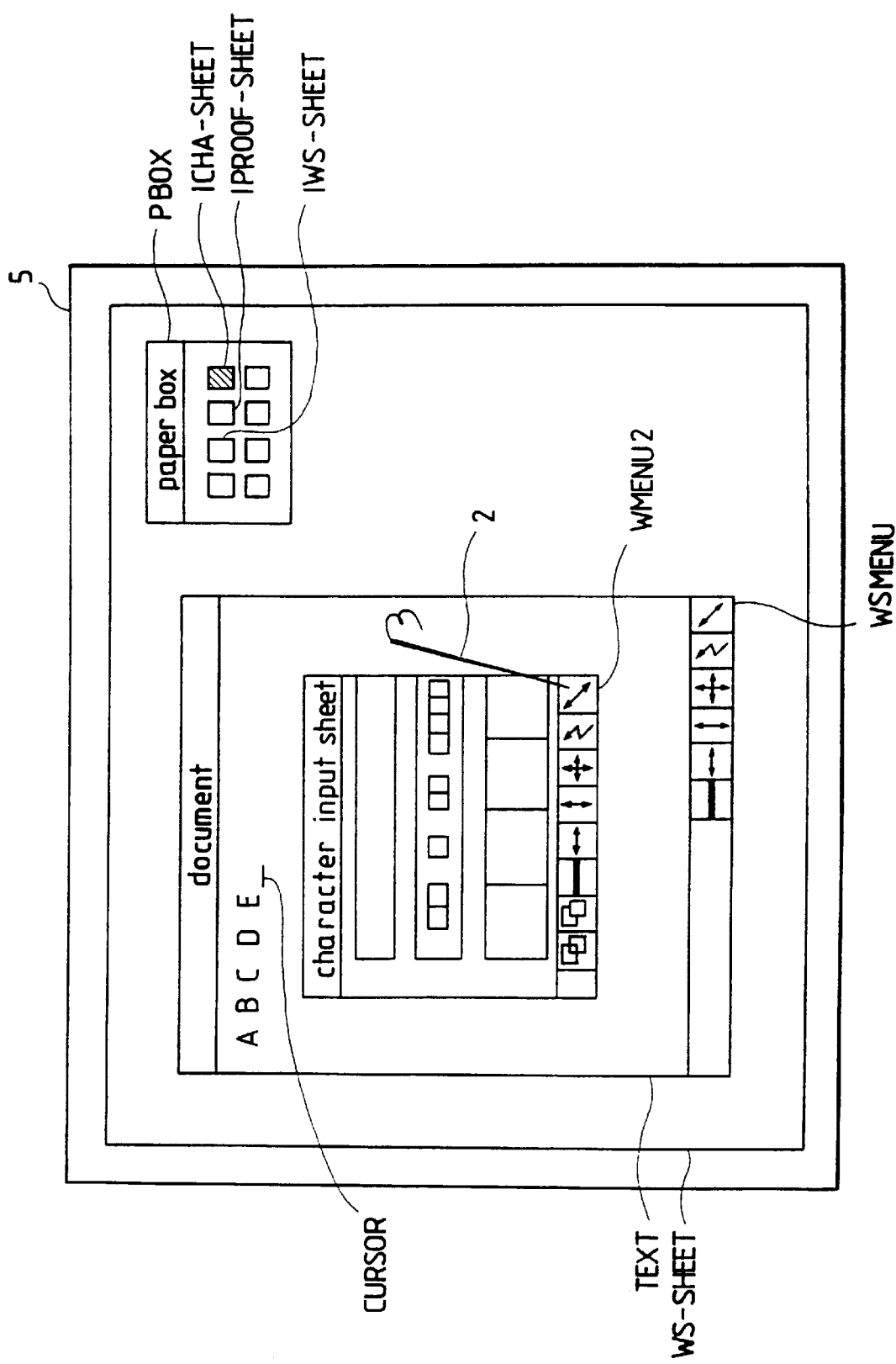

FIG. 16 shows that when the button WM1 is specified, the window size may be changed.

Because manipulation procedures of other window menus are similar to those of windows as instructed in the Operation Manual for Work Station 2050/32 made by Hitachi, Ltd., they are omitted here.

Figure 17:
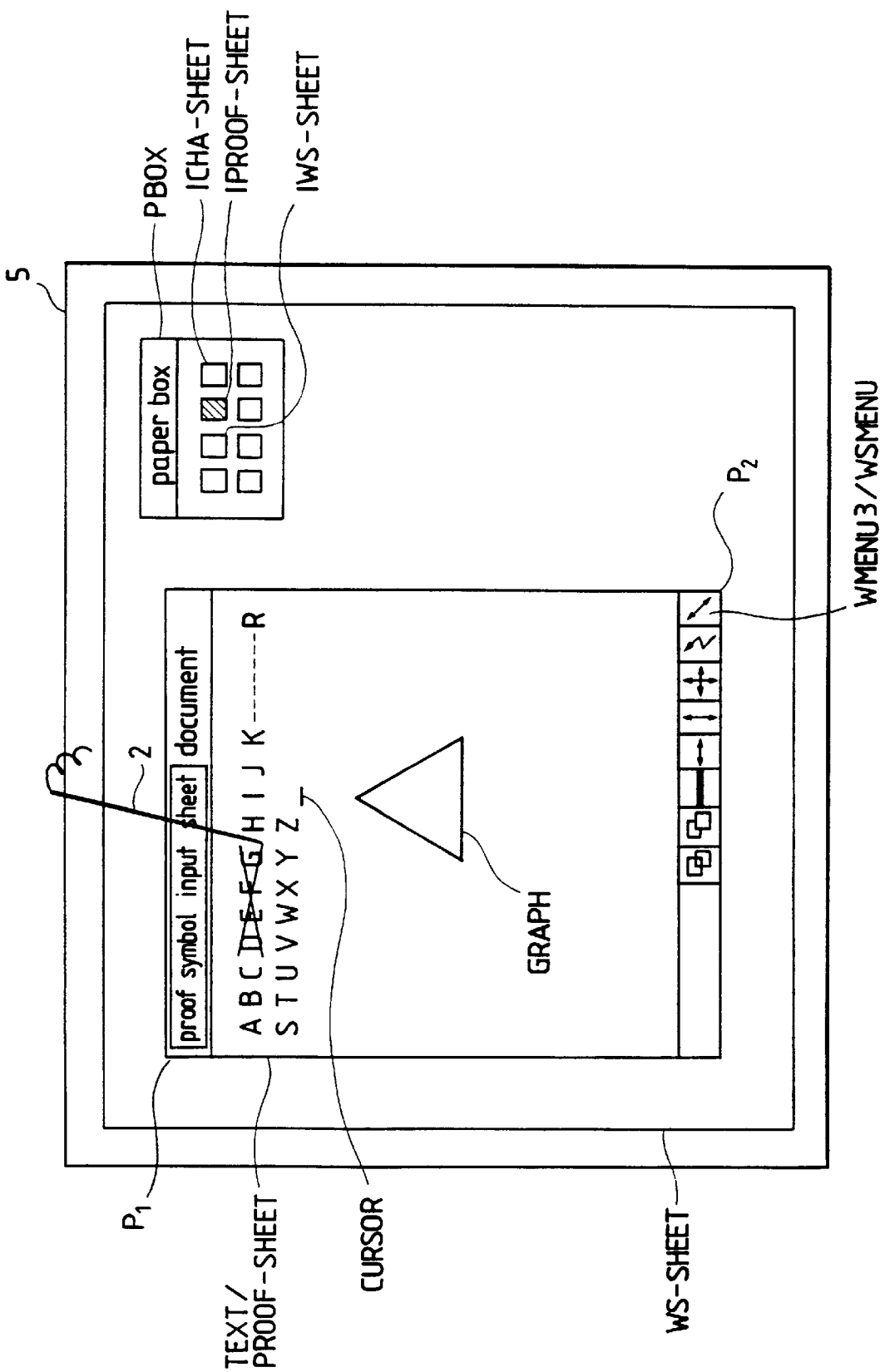

FIG. 17 is a display in which the character input sheet CHA-SHEET is closed (by WM16), a proof symbol input sheet IPROOF-SHEET of the paper box PBOX is opened and the text in WS-SHEET is edited by handwriting.

First, IPROOF-SHEET is clicked and information P1, P2 on the window of WS-SHEET is inputted, whereby the proof symbol input sheet IPROOF-SHEET is automatically mapped on the display screen such that it is exactly overlapping on the document TEXT. Additionally, the proof symbol input sheet window becomes transparent to make visible a string of characters on the back screen. Therefore, when a string of characters "DEFG" is to be deleted, it is possible directly to input a proof symbol " " for deletion.

Figure 18:
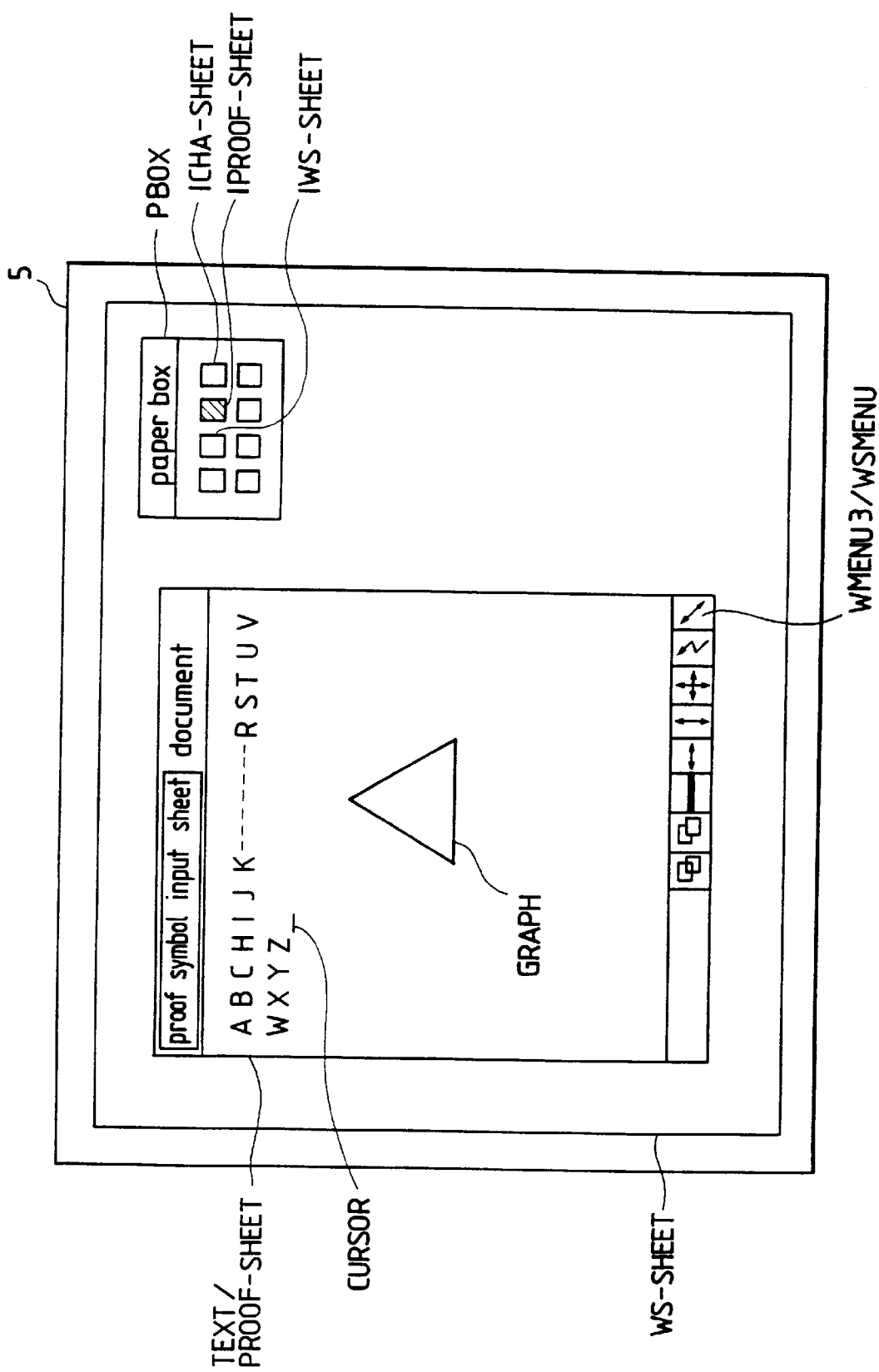

FIG. 18 shows that a character string "DEFG" is deleted when a proof symbol of deletion is inputted and recognised as a deletion command after a predetermined time (time-out).

Figure 19:
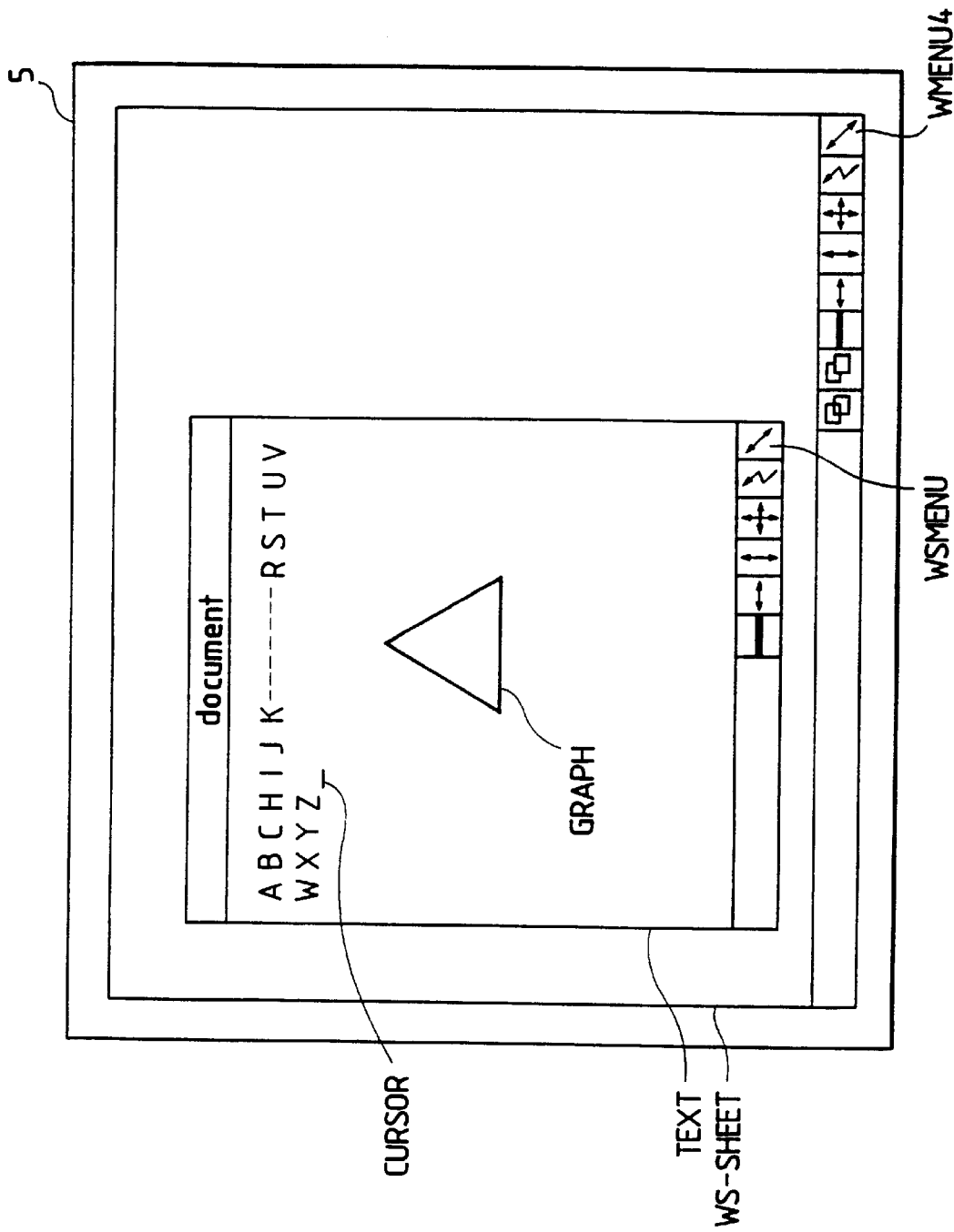

In FIG. 19, there is shown a display in which IWS-SHEET of the paper box PBOX is clicked and the window manipulation menu WMENU4 is displayed at the bottom of WS-SHEET. Usually, this window menu WMENU4 remains as a back display and therefore is not visible.

Figure 20:
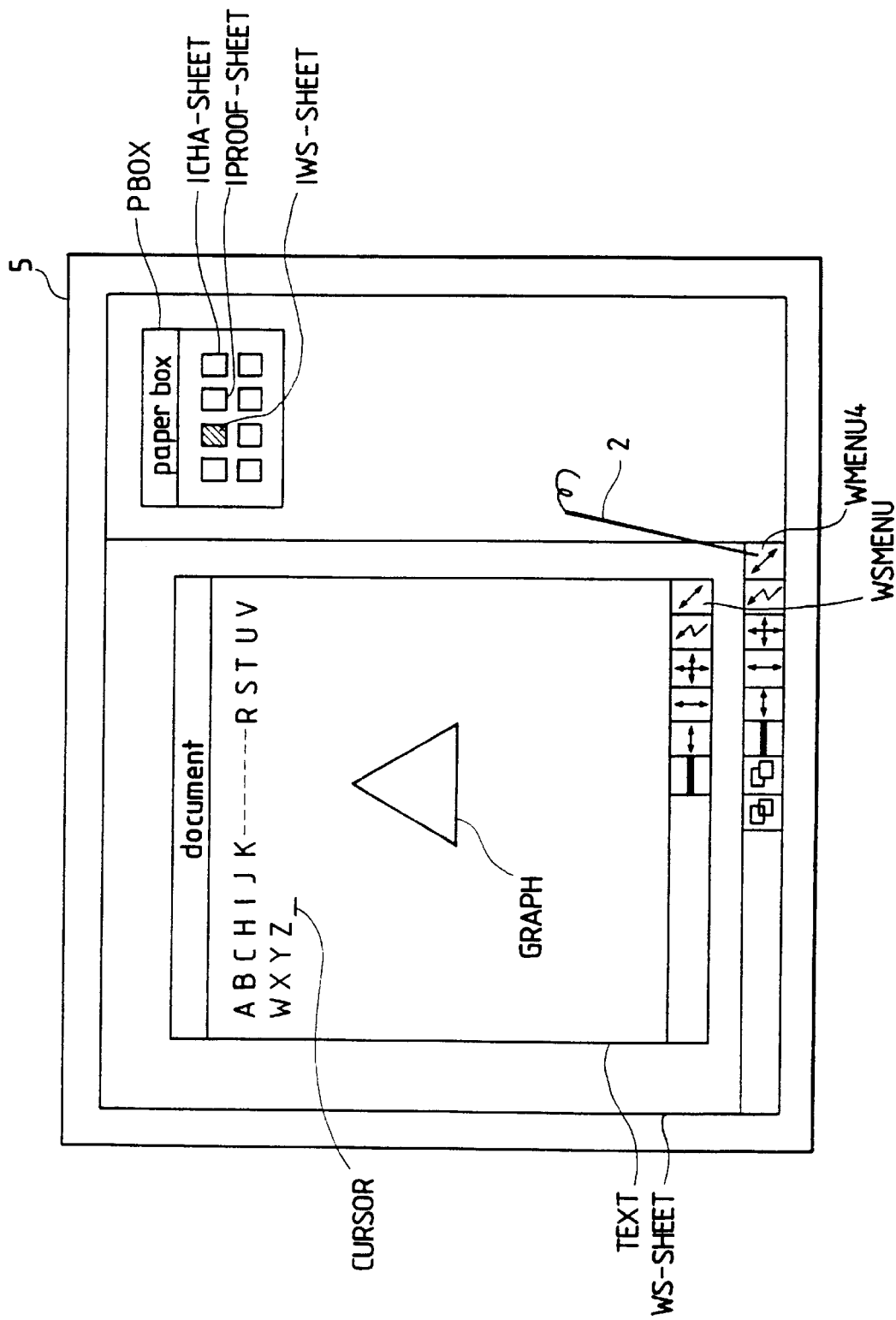

FIG. 20 shows the button WM1 of a window menu WMENU4 on WS-SHEET being operated by the stylus 2 to change the window size. In FIG. 20, since the window size is reduced, the paper box PBOX of the back display appears.

Figure 21:
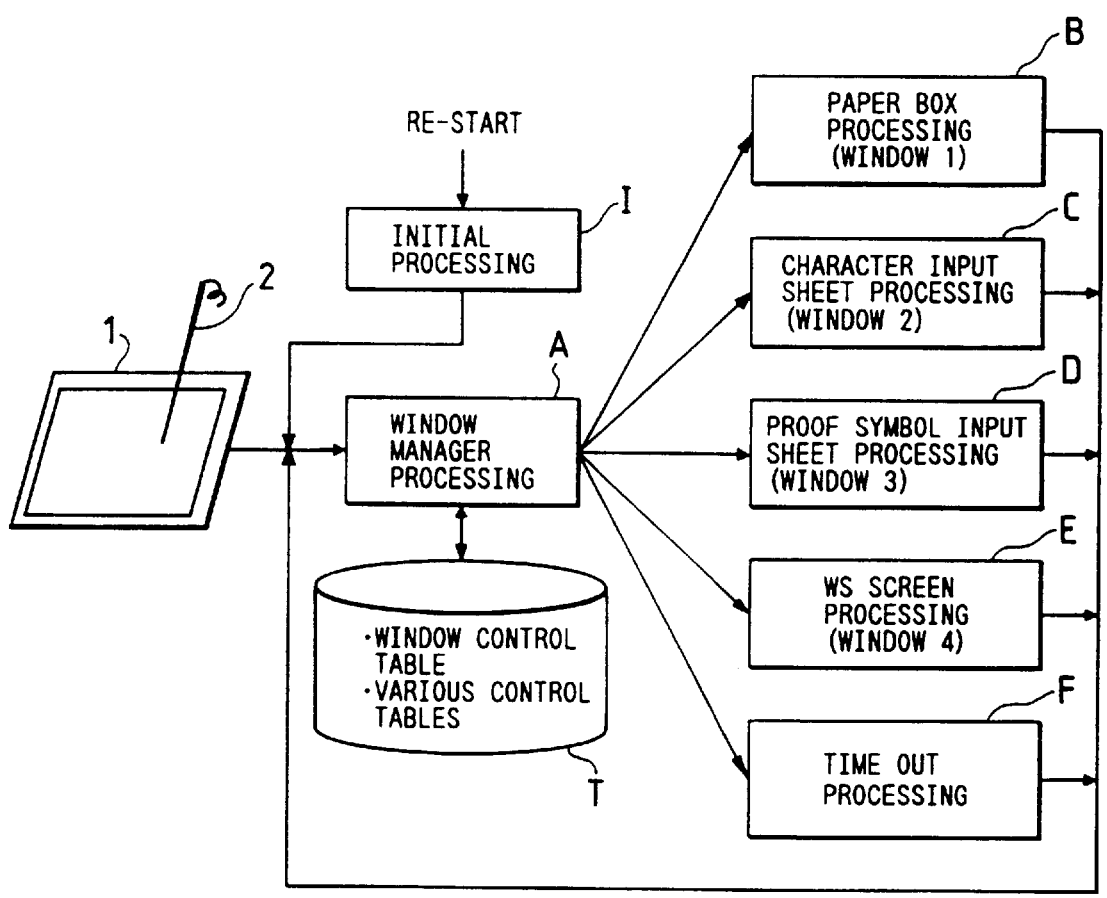
FIG. 21 shows the software configuration for the display device shown in FIG. 1.

The manipulation and operation procedures of the display device 5 have been generally explained. Referring to FIGS. 21 to 45, the software for achieving this will now be explained. FIG. 21 shows the software configuration for the display device 5. When power is turned on, an initial processing I is first executed and then ,he processing transfers to a window manager processing A. The window manager processing A takes a stroke from the touch pad 1 and the stroke is analyzed with reference to a window management table and various control tables T in which area of a window the stroke occurs. According to the analyzed result, the appropriate software of the display device 5 is activated. As previously described, the software includes:

(1) paper box Processing 3 (window 1)

(2) character input sheet processing C (window 2)

(3) proof symbol input sheet processing D (window 3)

(4) WS screen processing E (window 4)

(5) time-out processing F

The time-out processing F is used to determine the start timing of recognition, such as character recognition or proof symbol recognition.

Next, the detailed flow of each processing step will be explained, referring to FIGS. 22 to 44.

Figure 22:
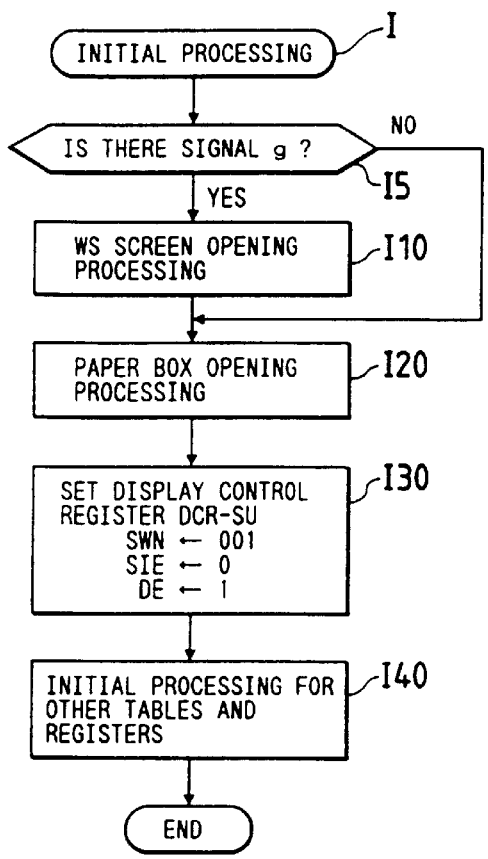
FIGS. 22 to 44 are flow charts showing the operation of the display device shown in FIG. 1

FIG. 22 is a flow chart showing the initial processing I. The first step I5 determines whether or not there exists the signal g indicating that a video signal has been supplied from the external computer 6. If signal g exists, the preparation for opening the WS screen and the paper box PBOX, which will be described in detail later, is carried out at steps I10 and I20. Otherwise, the processing goes to step 120 without executing step I10. Then at step I30, "001", "0" and "1" are set in SWN, SIE and DE of the display control register DCR-SU, respectively. This setting means that the window for the paper box PBOX should be displayed as a non-transparent display (cf. FIG. 7). Thereafter, the processing of this flow chart ends after an initial processing (step 140) of other tables or registers necessary for the processing in the display device 5.

Figure 23:
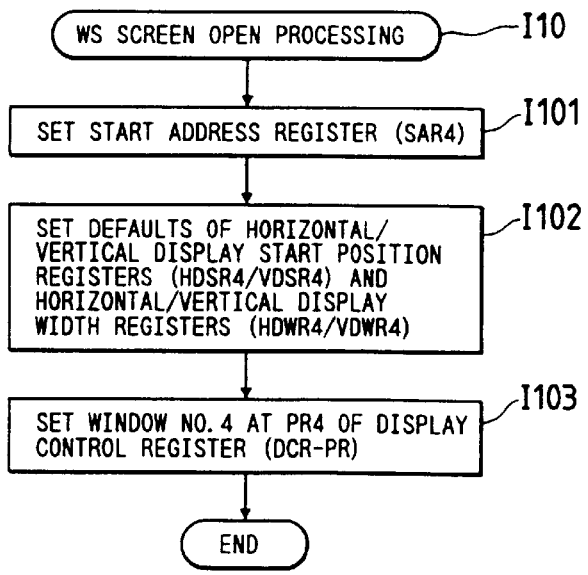
Figure 24:
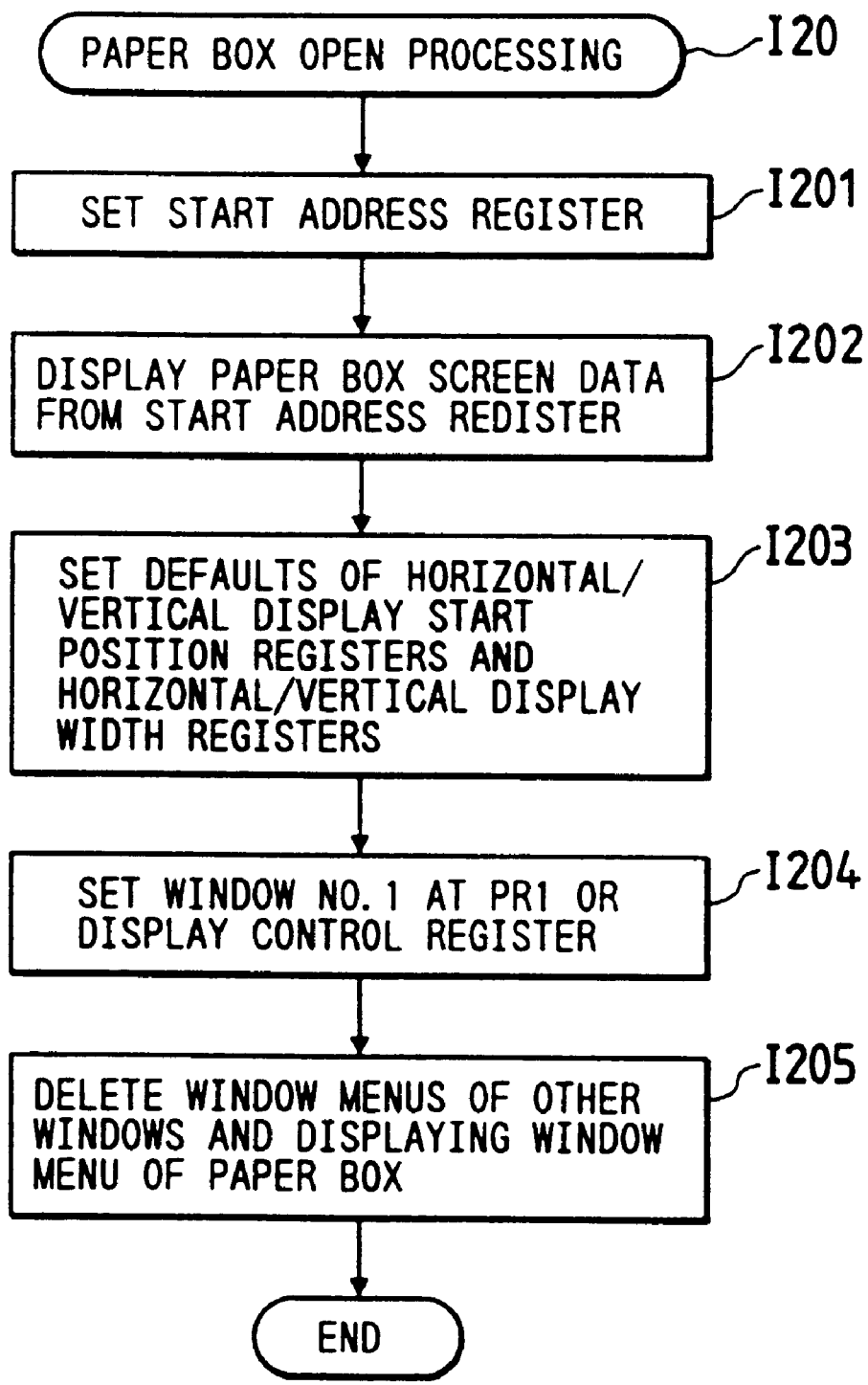

FIGS. 23 and 24 are detailed flow charts of the WS screen and the paper box opening processings (I10, I20 of FIG. 22), in which various registers in the window management register are set in accordance with -he screen assignment as shown in FIG. 8. In order to provide the paper box PBOX (window 1) and the WS screen (window 4) with the highest priority level and the lowest priority, respectively, the numbers of the respective windows are set in PR1 and PR4 of the display control register PCR-PR (cf. FIG. 6) at step I204 in FIG. 24 and step I103 in FIG. 23.

Figure 25:
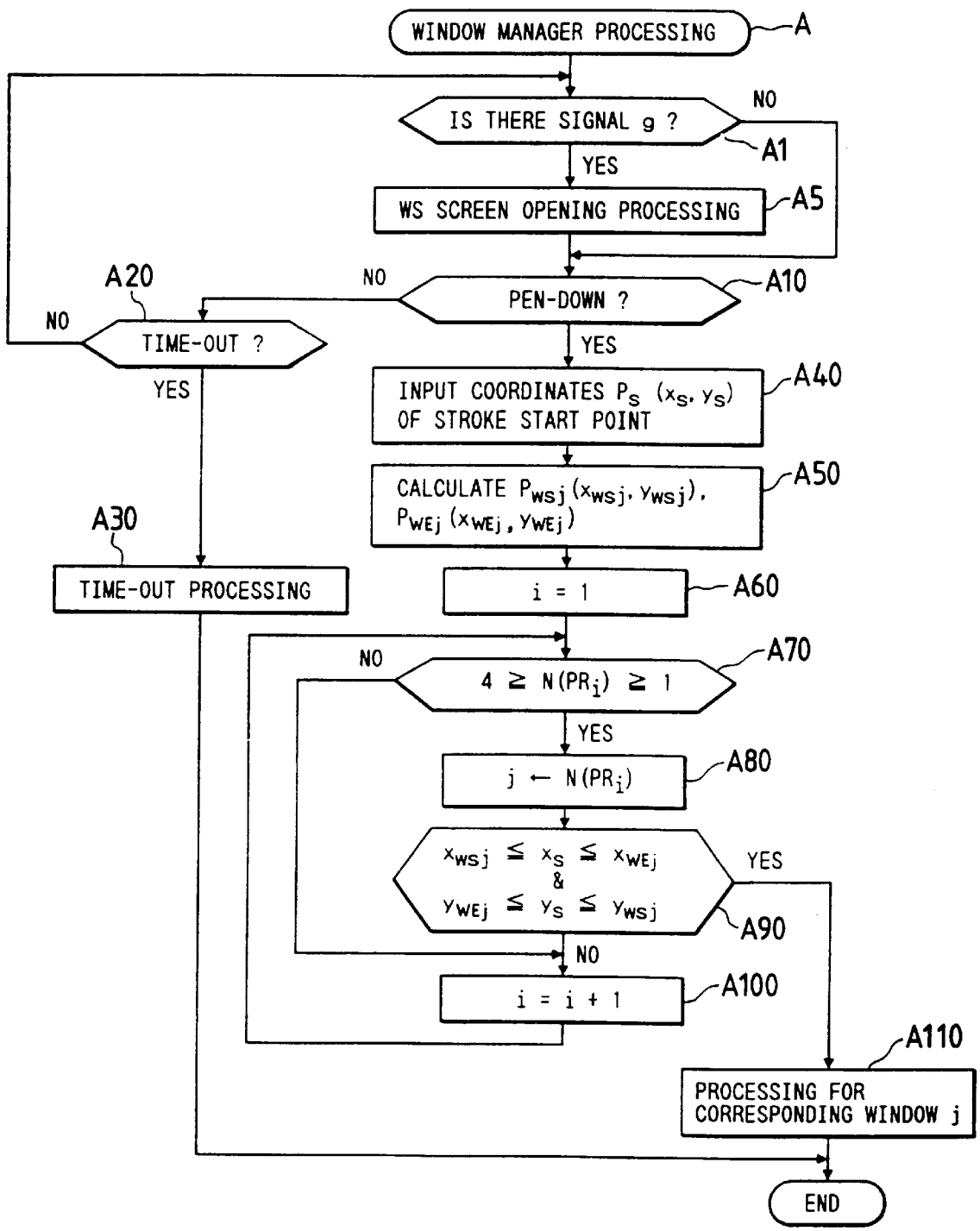

FIG. 25 is a detailed flow chart of the window manager processing A. First, step Al determines whether or not there signal g exists, indicating that a video signal has been supplied from the external computer 6. If signal g exists the WS screen is opened at step A5 and thereafter the processing goes to step A10. Otherwise, the processing at once jumps to step A10. Step A10 determines whether or not a pen is down, i.e., whether the stylus 2 is now inputting any stroke. If the pen-down stroke is detected, step A20 determines whether or not a predetermined time, e.g. about 2 sec., elapses.

If that time does not elapse, the above processing is repeated. Therefore, the above processing is periodically executed, until the predetermined time elapses or until the pendown state is detected. If the time elapses, the processing changes to time-out processing F, which will be described in detail later, and the processing of this flow chart ends.

If there is any stoke inputted, the pen-down state is detected at step A10. Coordinates Ps of a stroke start point are inputted at step A40 and then rectangular coordinates $P_{WSJ}$, $P_{WEJ}$ (window number j=1 to 4) are calculated by using the content of the window management registers at step A50. Next, steps A60 to A100 determine into which window the stroke start point coordinates Ps falls. This discrimination is carried out from the highest priority window down by at first setting of the priority index (PRi) at "1" (step A60) and then increasing it one by one (step A100), i.e., by repeating from PR1 to PR4 (step A70). When any search result is obtained, the processing transfers to processing of the corresponding window j (step A110) and the processing of this flow chart ends.

Figure 26:
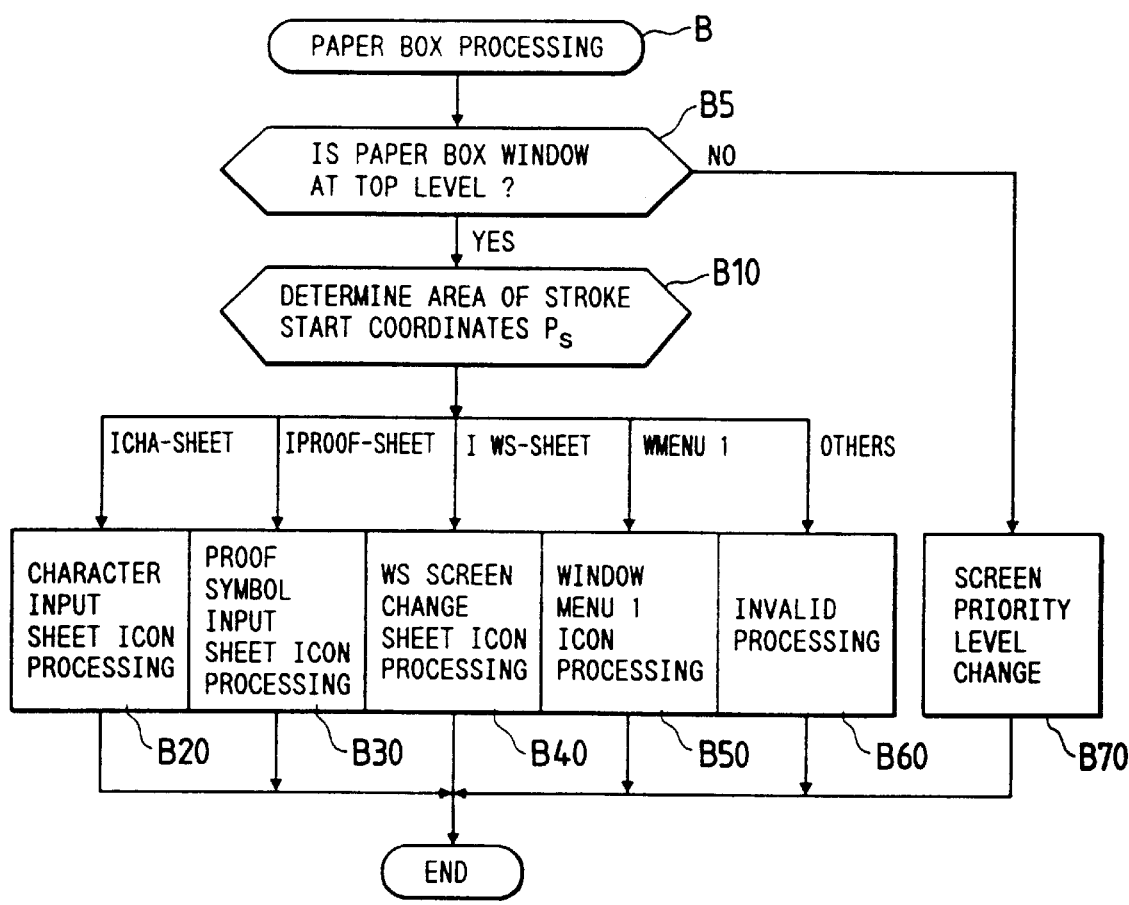

FIG. 26 is a detailed flow chart of the paper box processing B. First, at step B5, the content of the display control register DCR-PR is reviewed, to determined whether or not the window has the highest priority level and is ready to be manipulated. The reason for this is that the manipulation is limited to a window of the highest priority level. If it is not of the highest priority level, there is a change in the priority level of the window (step B70). If it is determined at step B5 that the window is of the highest priority level, the area in which the stroke start point Ps occurs, is determined (step B10). According to the area discrimination, various icon processings are activated (steps B20 to B60).

Figure 27:
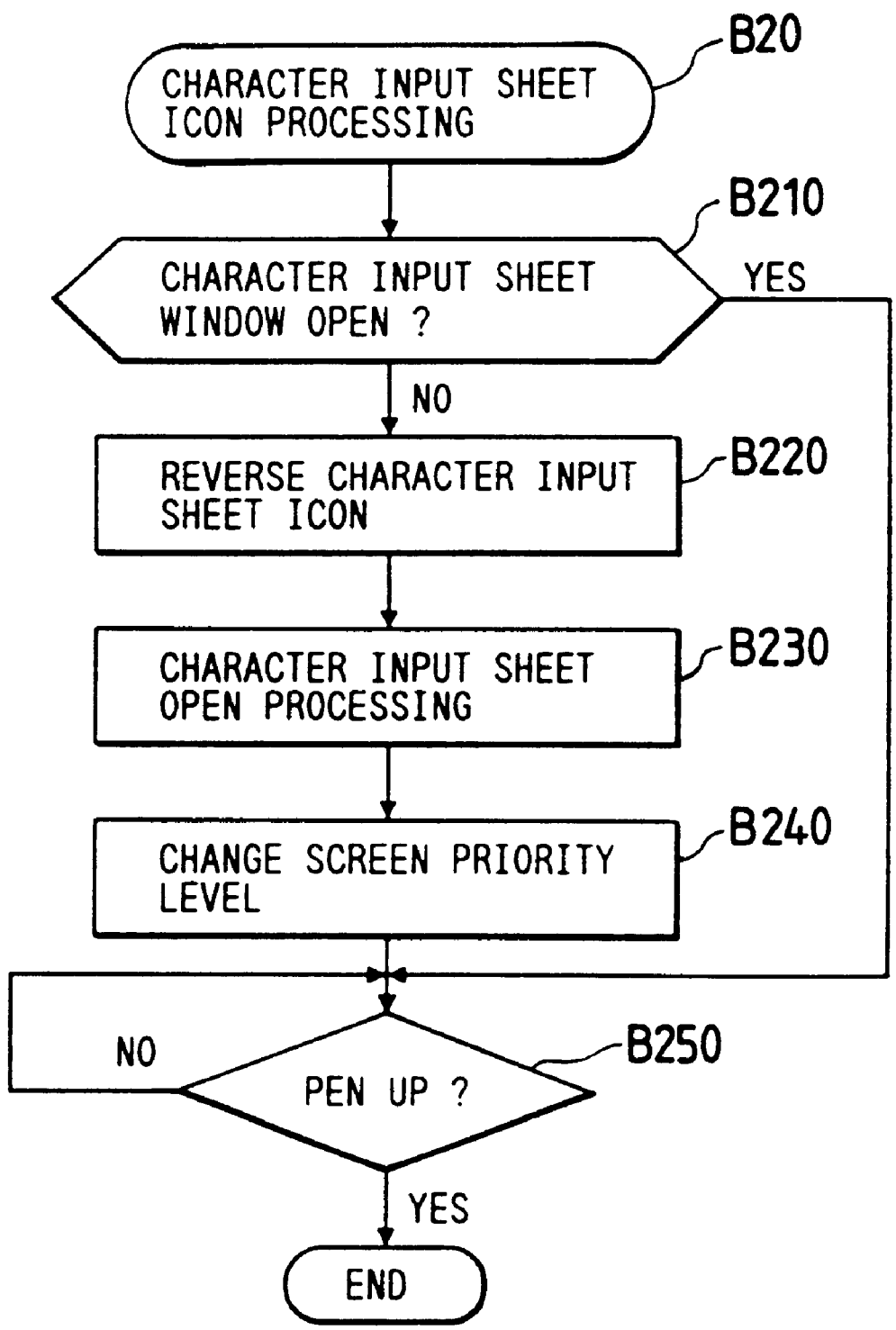

FIG. 27 is a detailed flow chart of the character input sheet icon processing (step 320 of FIG. 26). With this icon, the window of character input sheet CHA-SHEET is actually opened (steps B210 to B240). This processing is repeated until it is detected at step B250 that strokes of one character are no longer being inputted (pen-up).

The proof symbol input sheet icon processing (B30) will be described in detail Later, referring to FIG. 40. As is apparent from the comparison between FIGS. 27 and 40, the difference between the two icon processings is only in the name of the sheet, i.e., "CHA-SHEET" and "PROOF-SHEET". The remaining two steps (B40 and B50) of icon processing can also be achieved in the same manner. Therefore, further description thereof is omitted.

Figure 28:
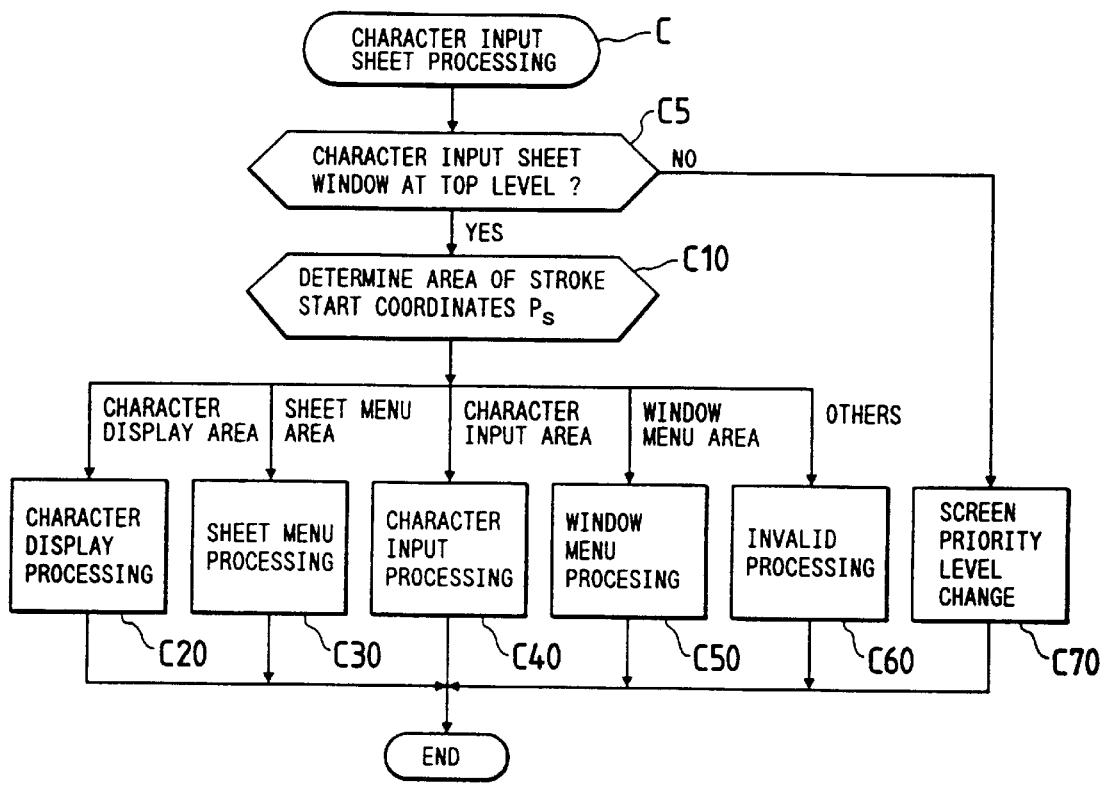

FIG. 28 is a detailed flow chart of the character input sheet processing C. As is apparent from steps C5 and C70, it is first determined whether it is ready to be operated and then a necessary processing is carried out similarly to steps B50 and B70 in FIG. 26.

Next the area in which the stroke start point Ps is inputted is determined according to the screen layout of FIG. 10 (step C10). In accordance with the discrimination result of the processing at step C10, a corresponding processing is activated (steps C20 to C60).

Detailed flow charts of a character input processing at step C40 and a window menu processing at step C50 will be explained, referring to FIGS. 29 to 39. The explanation of other processings is omitted, because it can be readily understood from the similarity to these processing flow charts.

Figure 29:
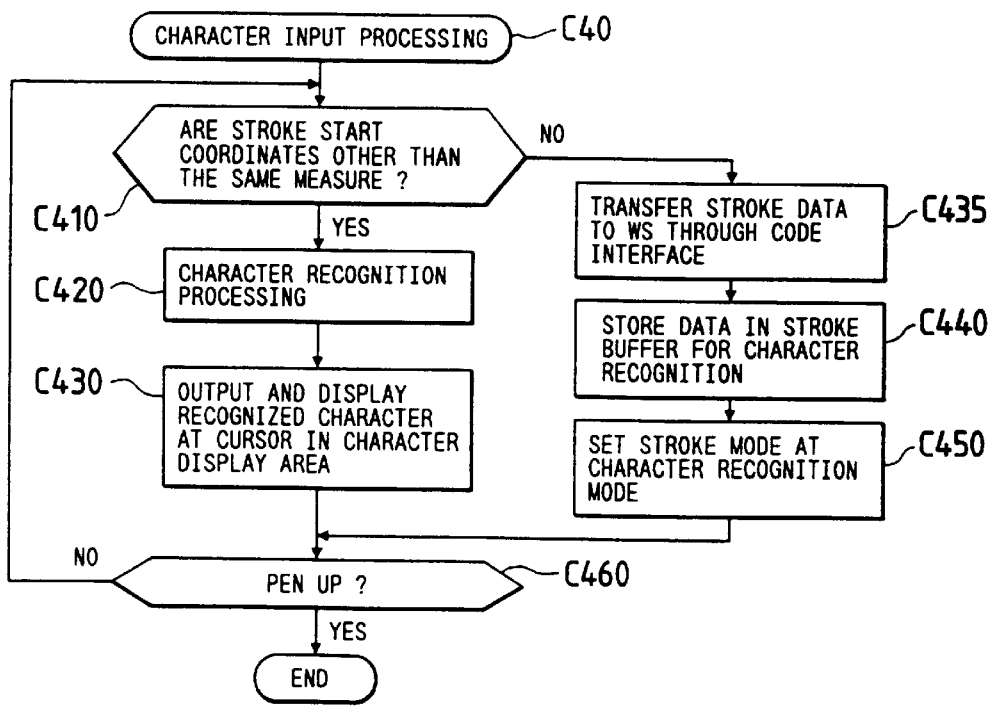

FIG. 29 is a detailed flow chart of a character input processing C40 for the character display area of FIG. 10.

First it is determined whether the stroke start coordinates Ps are inputted in a square other than the same square (step C410). If it is within the same square, it is determined that a hand-written character is still being inputted and stroke data (coordinate values) are transferred to the external computer 6 through the code interface 43. Handwriting is displayed on the WS screen (cf. FIG. 11). and the stroke data is stored in a buffer (step C440). Further the current recognition mode is set so that it is a mode in which characters are recognised (step C450).

If it is determined at step C410 that the stroke starting point coordinates Ps are outside the same square, stroke data, which have been inputted so far, are clipped as one character and the character recognition processing is executed (step C420). This result is displayed at the cursor location in the character display area (FIG. 10) (step C430). The above processing is repeated until the pen is up (step C460) and thereafter the character input processing ends.

If all character are inputted in the character display area and as shown in FIG. 12, and the button "transfer" is clicked, any handwriting displayed on WS-SHEET is deleted and correctly written characters are substituted therefor and displayed one after another, as shown in FIG. 13.

Figure 30:
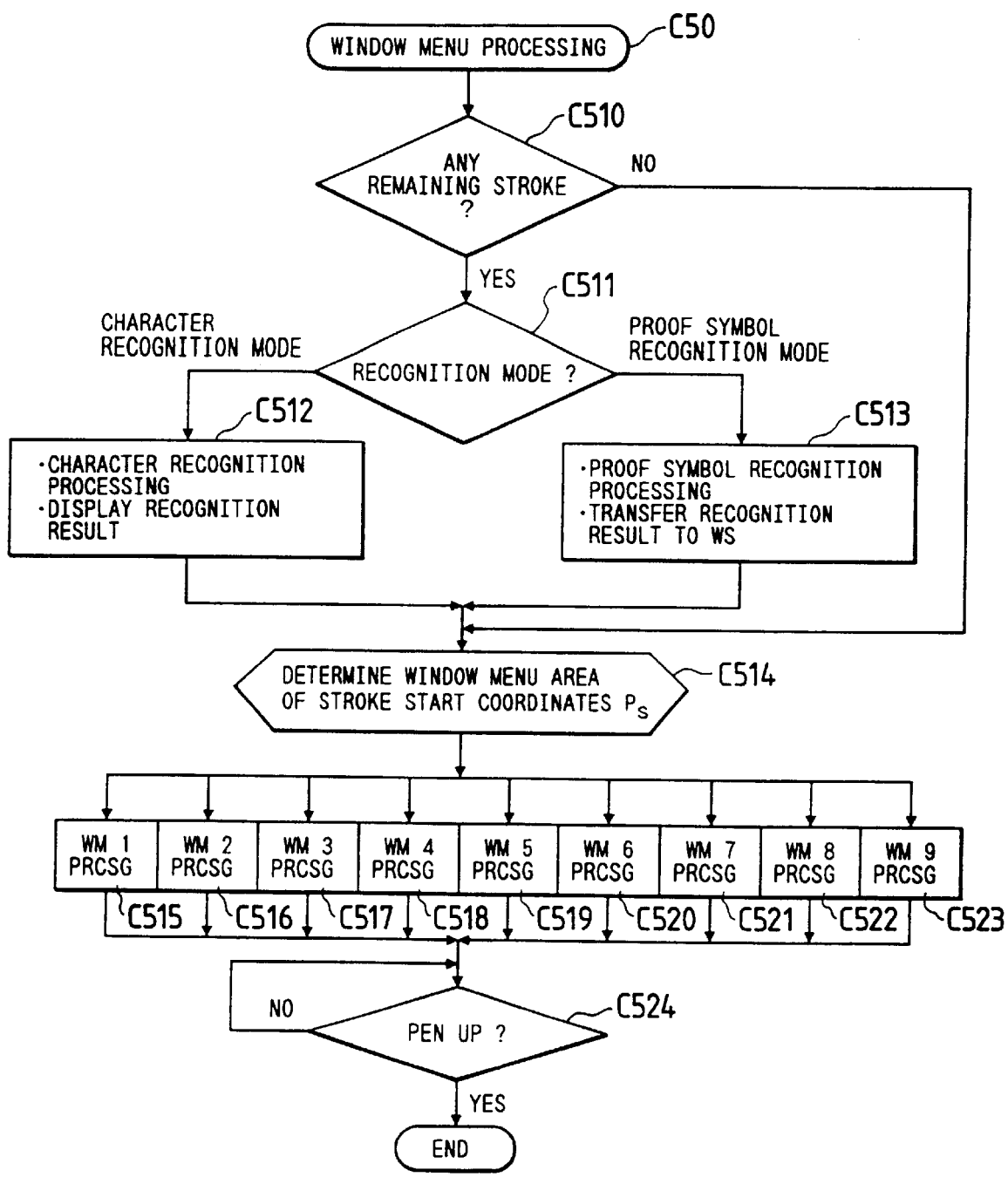

FIG. 30 is a flow chart of the window menu processing at step C50 of FIG. 28. Processing at steps C510 to C513 discriminate whether there is anything that remains unrecognised in the character input sheet or the proof symbol input sheet (described later). If there is anything unrecognised, a corresponding recognition processing is executed. Usually, there are no remaining strokes, and therefore the processing jumps to step C514. Step C514 discriminates the area of the window menu in the same manner as described above, whereby a button for a corresponding processing As selected (step C515 to C523). FIGS. 31 to 39 show details of this window menu processing (WM1 to WM9).

Figure 31:
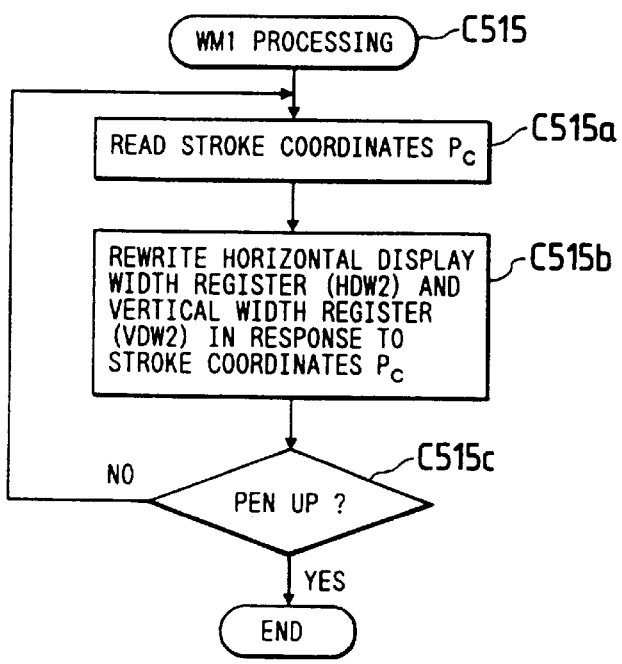

FIG. 31 is a flow chart of the window size changing processing WM1. The window size can be changed by dynamically rewriting the horizontal/vertical display width registers (HDW2/VDW2) in correspondence to the current stroke coordinates Pc.

Figure 32:
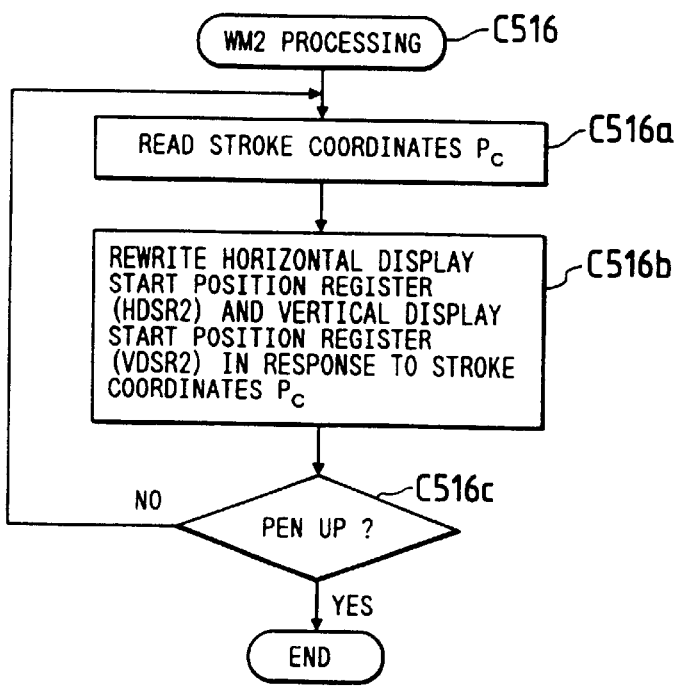

FIG. 32 is a detailed flow chart of the processing WM2 required to move the window location. Windows can be moved by dynamically rewriting the horizontal/vertical display start address registers (HDSR2/VDSR2) in correspondence to the current stoke coordinates Pc.

Figure 33:
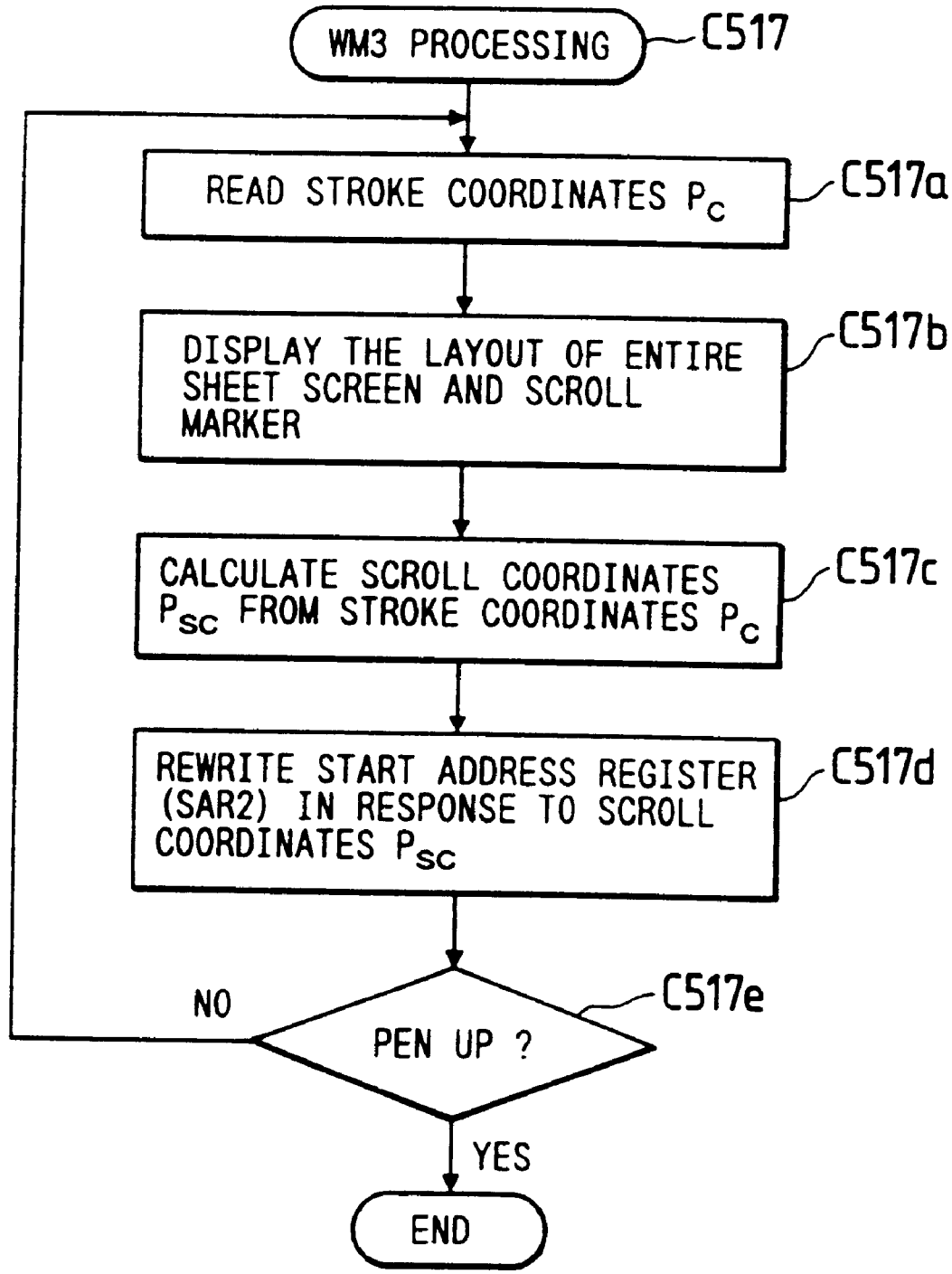

FIG. 33 shows a processing WM3 to scroll the contents of the window up and down and right and left. This can be achieved by dynamicaly rewriting the start address register (SAR2) of the window management register in correspondence to the current stroke coordinates Pc.

Figure 34:
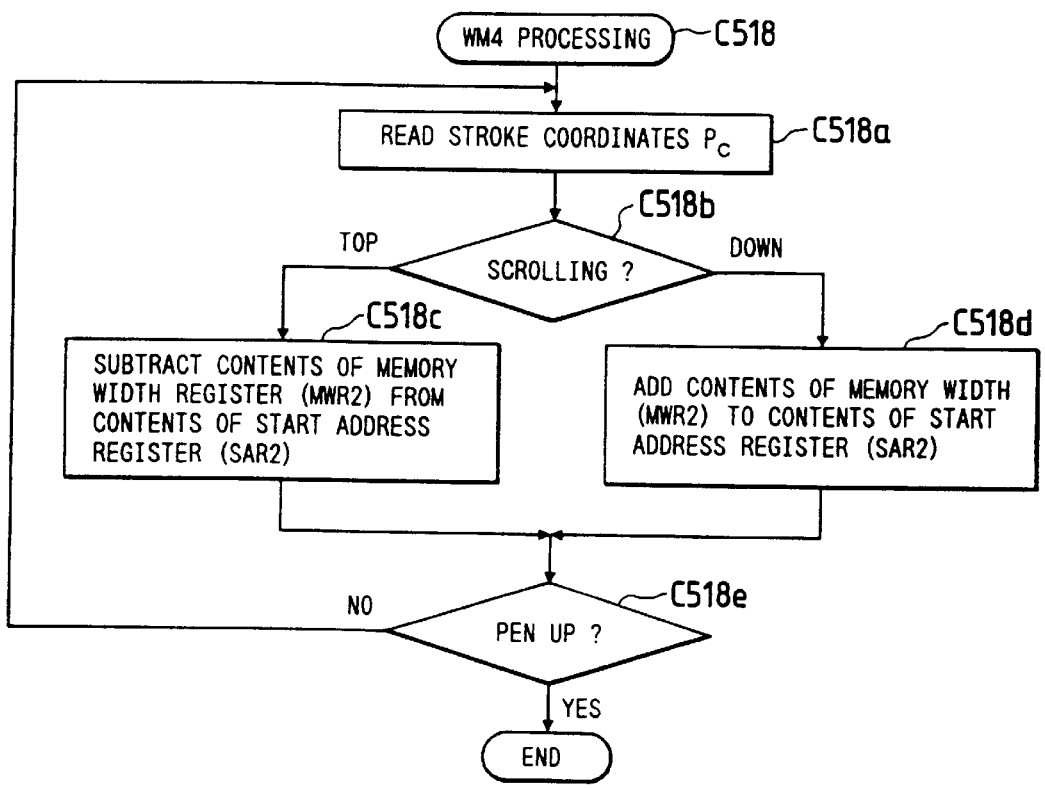
Figure 35:
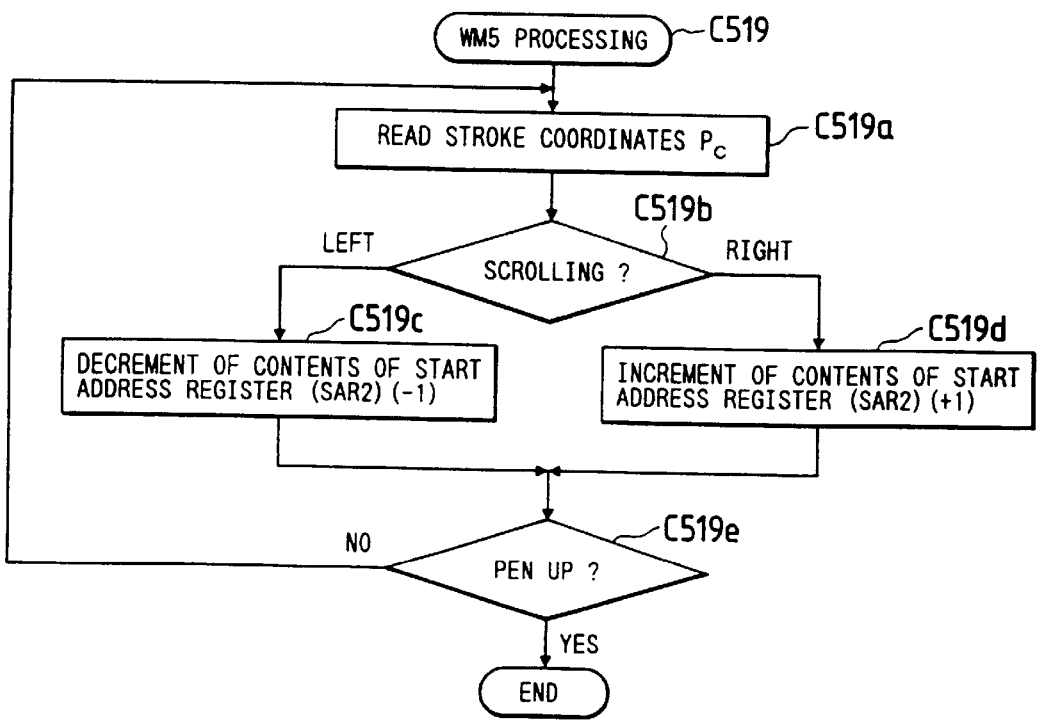

FIGS. 34 and 35 are detailed flow charts of processings WM4 and WM5 for up and down scrolling and right and left scrolling, respectively. Up and down scrolling in FIG. 34 can be achieved by adding or subtracting the memory width register (MWR2) to or from the start address register (SAR2). On the other hand, right and left scrolling in FIG. 35 can be achieved by incrementing or. decrementing the contents of the start address register (SAR2).

Figure 36:
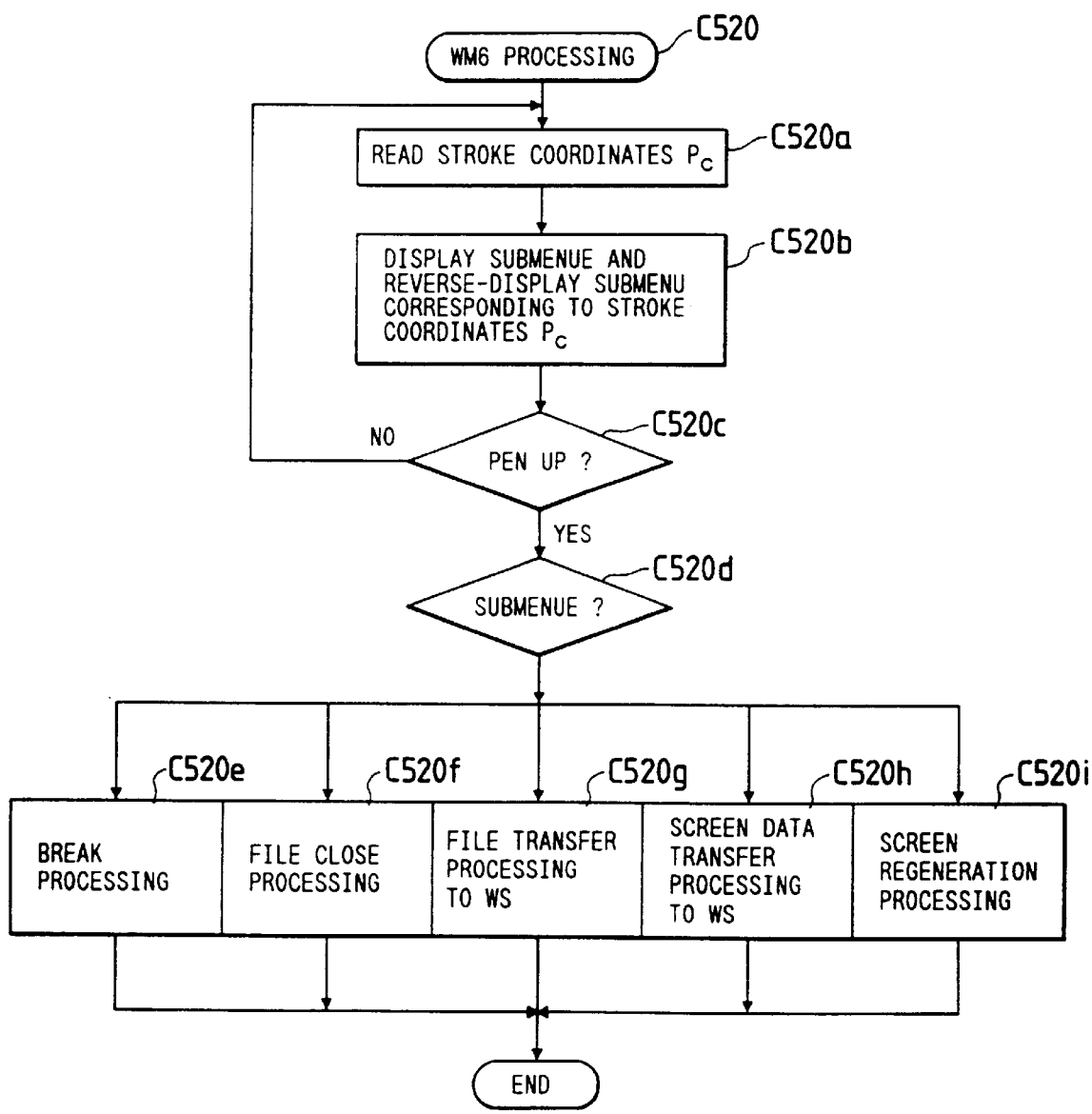

FIG. 36 s a detailed flow chart of a processing WM6 for the file operation. If the stroke-down is detected, the current stroke coordinates Pc are read, and at the same time, the pull-up submenu (a menu dynamically displayed, areas of which are displayed in a reversed tone) is displayed and the processing is executed until the pen is up (stroke-up) (steps C520$a$ to C520$c$). If it is detected at step C520$c$ that the pen is up, a corresponding one of the sub-processings (step C520$e$ to C520$i$) is. executed. The buttons for selecting file operation subprocessing include:

(1) break: a button to suspend unconditionally the processing of a window which opens, and to close the window;
(2) file close: a button to store codes in the electronic paper or screen data in its own file and close the window. When closing a file, it is of course necessary to input a suitable file name etc.;
(3) file transfer: a button to transfer code data in the display device 5 or screen data to the external computer 6 through the code interface signal line d. using a predetermined protocol;
(4) screen transfer: a button to transfer data of all screens (including internal/external screens) displayed on the display device 5 to the external, computer 6. This button is the same as a screen copying function and can be used when printing screen data of the display device 5 in the external computer 6; and when printing screen data of the display device 5 in the external computer 6; and
(5) redisplay: a button to redisplay screen data of the display device 5. It is usually used when removing "garbage image" from a screen, which often remains undesirably on a screen as the result of repetitions of various image processing.

Other file operation processings may be considered but they are omitted here.

Figure 37:
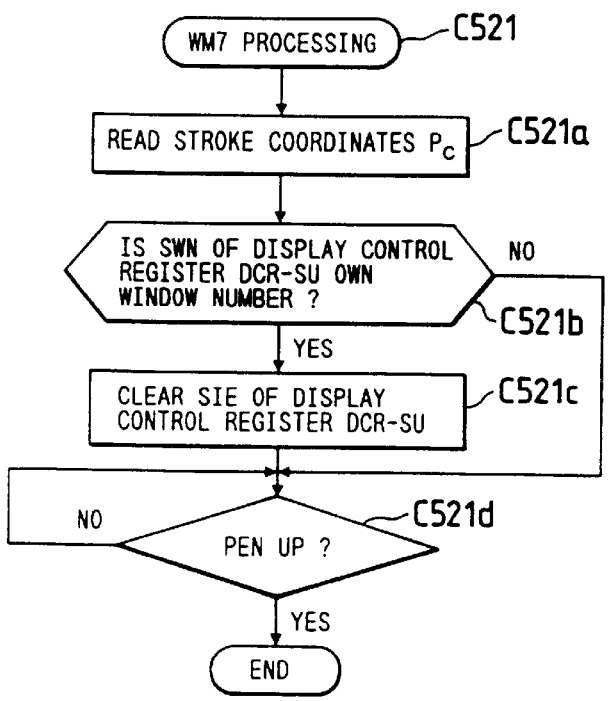
Figure 38:
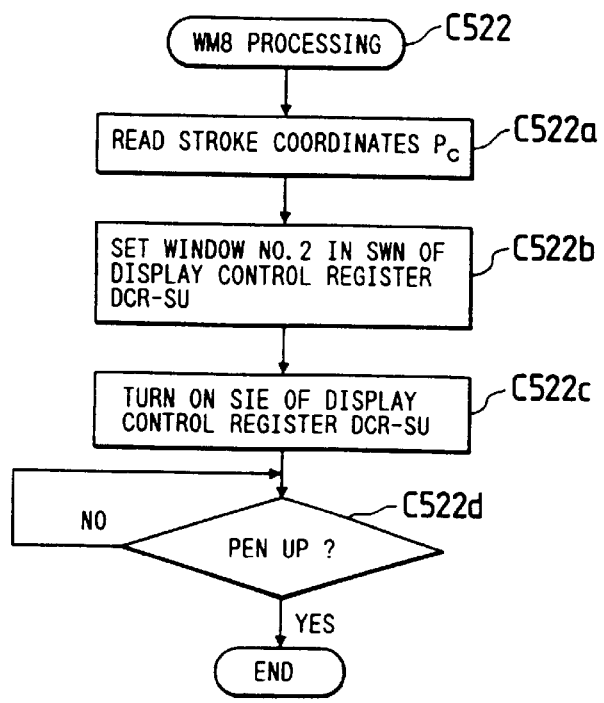
Figure 39:
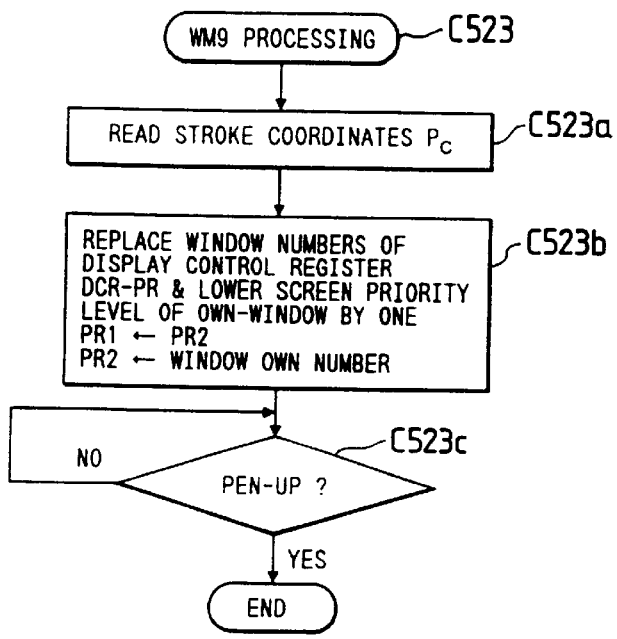

FIGS. 37, 38 and 39 are detailed flow charts of window menu processings WM7, WM8 and WM9 to change the screen synthesis mode.

FIG. 37 shows the processing to make the window display non-transparent against a back screen (as a result, the back screen becomes invisible). When the number of the window is in SWN of the display control register DCR-SU the window display is made non-transparent by clearing SIE (steps C521$b$ and C521$c$).

On the other hand, FIG. 38 shows the processing for making the screen display transparent against the back screen, which can be done by setting the number against the back screen, which can be done by setting the number of the window in SWN of the display control register DCR-SU and turning SIE thereof on.

FIG. 39 is a detailed flow chart of a menu processing WM9 to lower the display priority level of the window by one level. This can be done by replacing the window number of the display control register DCR-PR (step C523b).

Figure 40:
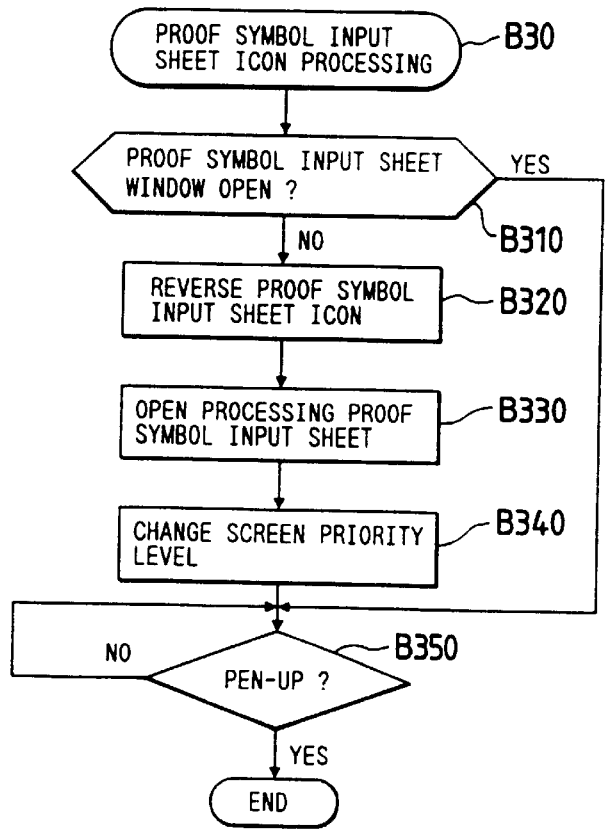
Figure 41:
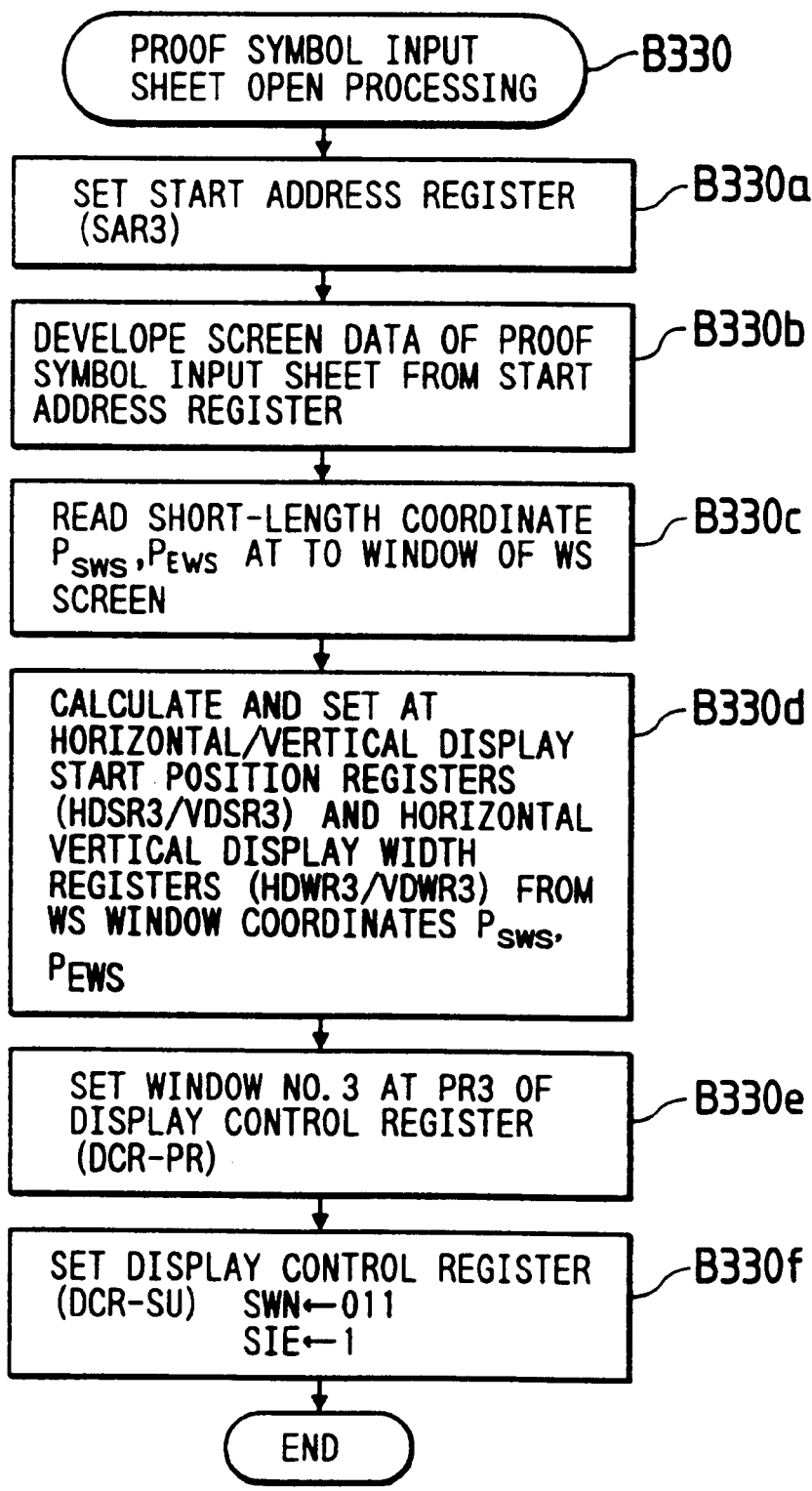
Figure 42:
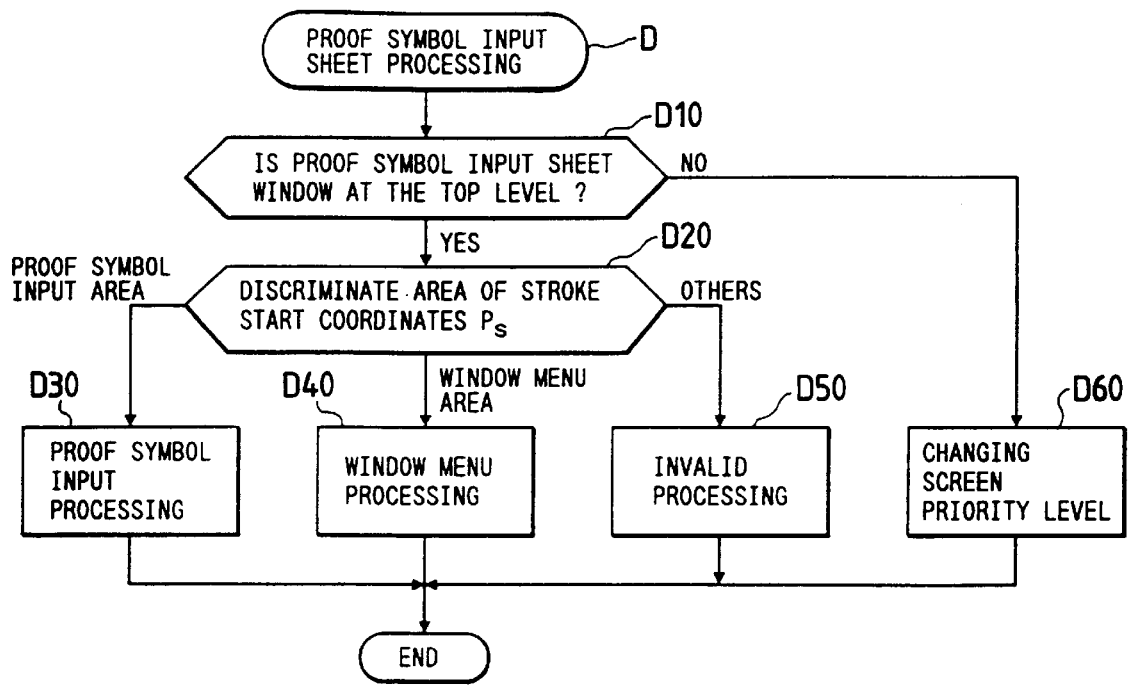

FIGS. 40 to 42 are flow charts to achieve processing of the input of a proof symbol, as shown in FIG. 17.

First, when the processing B30 is selected in FIG. 26, the proof symbol input sheet icon processing B30 in FIG. 40 is initiated. That is to say, the proof symbol input sheet icon is displayed in a reversed tone and the proof symbol input sheet is opened (steps B320 asnd 3330). At the same time, the screen priority level is changed such that PROOF-SHEET (FIG. 17) has the highest priority level, so that it is displayed (step B340).

FIG. 41 is a detailed flow chart of proof symbol input sheet opening processing at step B330. The difference between the opening processing of this sheet and that of other sheets is that a window display location is automatically mapped and the screen is made transparent (step 330f). This is illustrated in FIG. 17. Since the window display location overlaps on the document TEXT immediately upon opening the proof symbol input sheet, it is possible to directly input a proof symbol in the area to be edited. If this function is not provided, the user must map by manipulating the window menu, so that there is a deterioration in performance. Further, regions P1 and P2 in FIG. 17 correspond to PSWS and PEWS in FIG. 41, and this window information is obtained from the external computer 6 through the code interface line d.

FIG. 42 is a detailed flow chart of proof symbol input sheet processing D. The proof symbol input sheet is divided into a proof symbol input area and a window menu area, which are discriminated by the stroke start coordinates Ps (step D20), and a corresponding processing is activated (steps D30 to D50). Invalid processing at step D50 means that no operation is carried out, i.e. an input signal is ignored and the input of something in the title area "proof symbol input sheet" in FIG. 17 is an example of this.

The proof symbol input processing at step D30 only inputs strokes, and the actual recognition is carried out at step C512 in FIG. 30 or the time-out processing F in FIG. 44, which will be explained later. Since the window menu processing at step D40 in FIG. 42 is the same as that (step C50) in FIG. 30. its explanation is omitted here.

Figure 43:
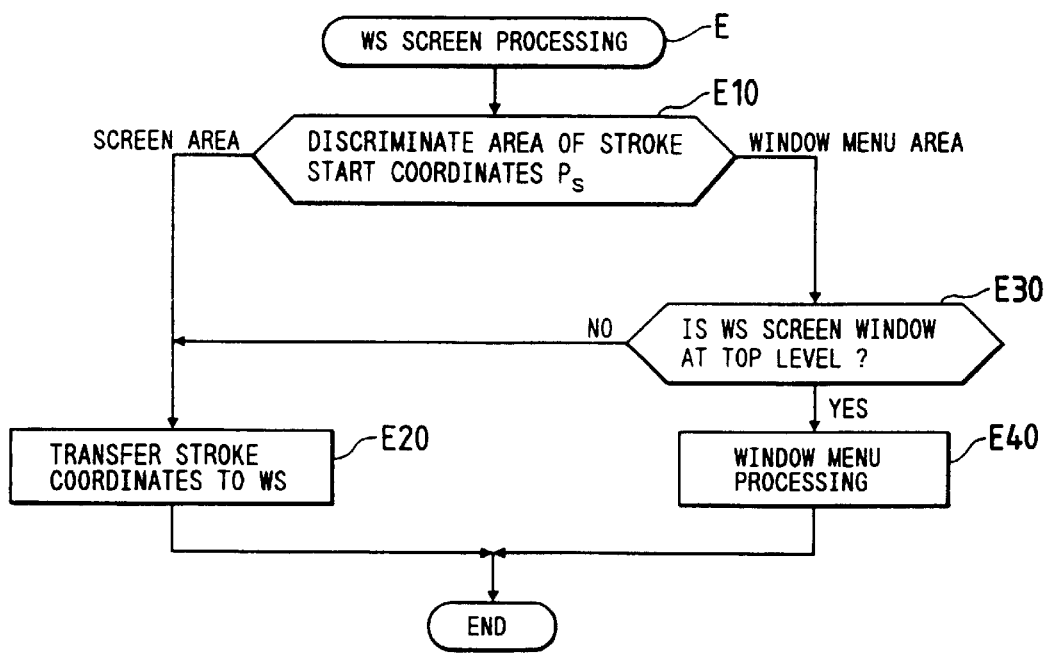

FIG. 43 is a processing flow chart from the transfer of all stroke coordinates to the external computer 6 through the WS screen processing E. However, when this screen (WS-SHEET) is of the highest priority level, a window menu is displayed and therefore the window menu area becomes valid so the window can be manipulated (steps E10 to E40).

Figure 44:
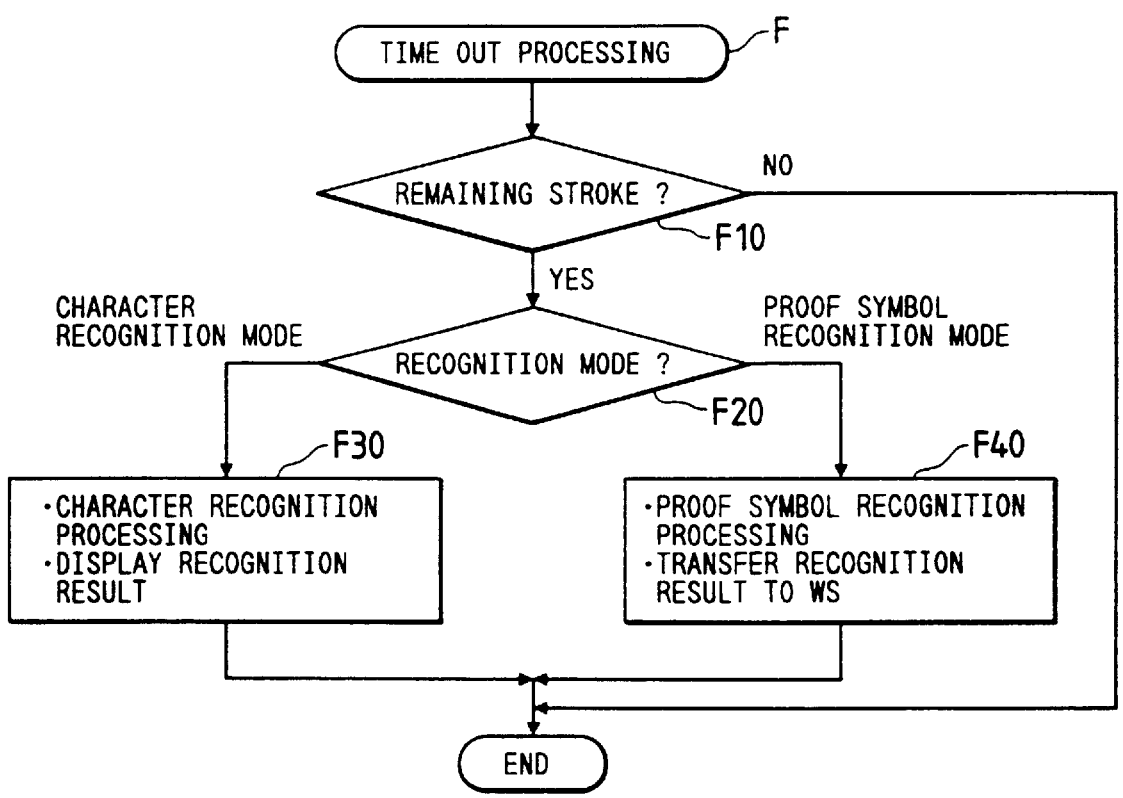

FIG. 44 shows the time-out processing F, which is activated by the window manager in FIG. 25. This activation is carried out regularly at intervals of a few seconds when no stroke is inputted (when the pen is up). The time-out processing F ends without doing anything if there are no remaining strokes (unprocessed strokes) (step F10). However, if there remain any unprocessed strokes, a corresponding processing is executed according to the recognition mode at that time (steps F30 and F40)

Furthermore since algorithms for character recognition and proof symbol recognition have already been known in various publications and patents, further explanation is omitted here.

Figure 45:
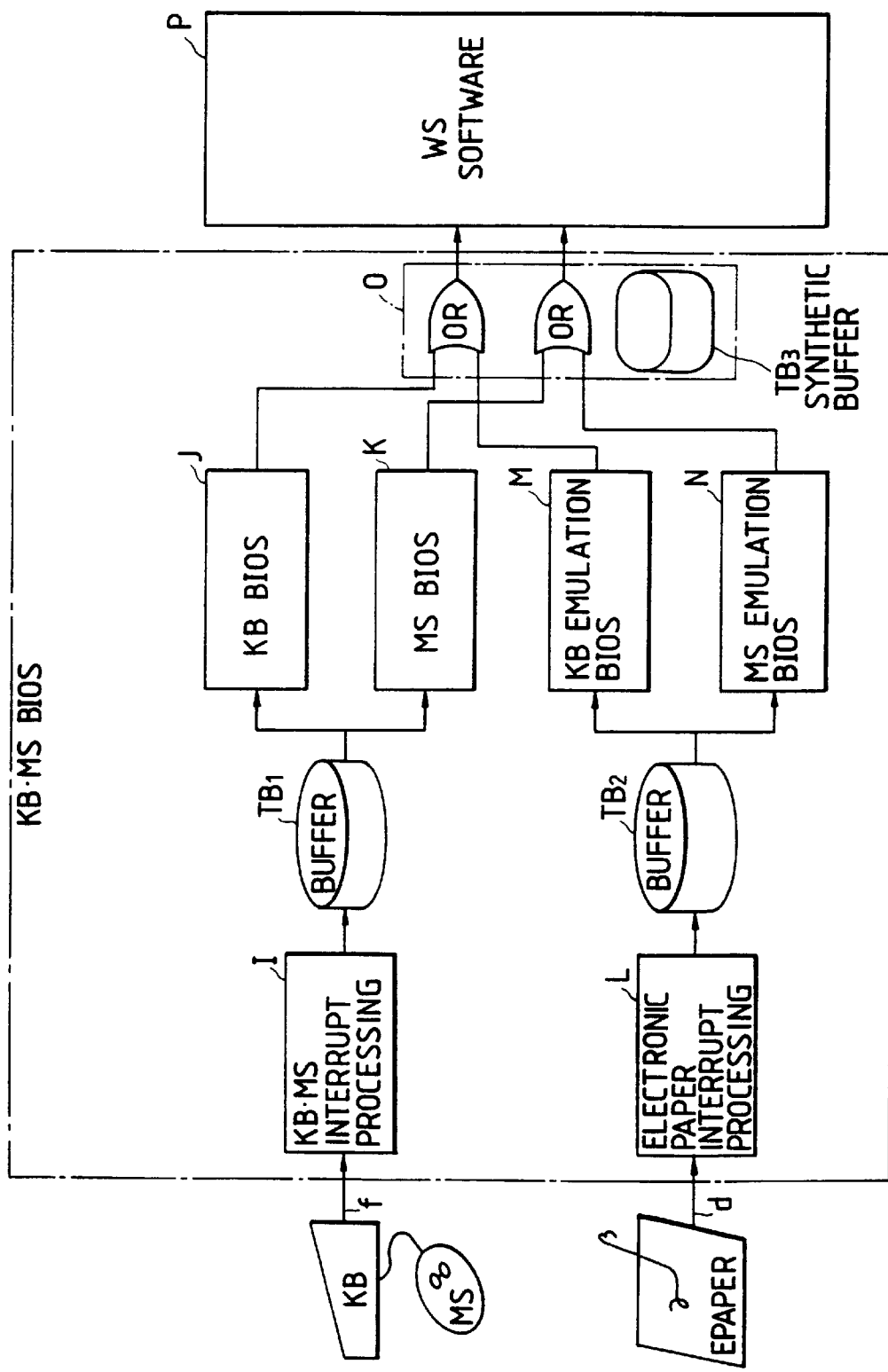
FIG. 45 shows in more detail the structure of the external computer shown in FIG. 1.

The software of the display device 5 has now been discussed. Next, the software of the external computer 6 will be explained, referring to FIG. 45, in which the video interface line e is omitted. FIG. 45 shows that configuration of the software of a known basic input/output system (BIOS) for the keyboard/mouse (KB/MS) of the input/output software of the external computer 6. The basic idea of FIG. 45 is that the No. 2 KB/MS interface signal d, which is the same as the KB/MS interface signal f, is provided, and data from both signals is synthesized in time series by a data synthesis circuit 0. It is then stored in a synthetic buffer TB3. Therefore, application (AP) software of the external computer 6 is interfaced through this synthetic buffer TB3 (which has conventionally been referred to the contents of the buffer TB1).

Blocks M and N are emulation functions of blocks J and K.

Some advantages of the embodiment described above will now be discussed. Firstly, since the information from the display device 5 and the external computer 6 may be synthesized and displayed, it is possible to control two working environments with only one screen, whereby the performance is improved. Secondly, the screen synthesis circuit 47 permits two displays to coexist without depending on various OSs (operation systems) or application software, by connecting the display device 5 and the external computer 6 to each other by the code interface and the video interface.

Thirdly, since the code interface may be connected to the No. 2 KB/MS interface of the external computer 6 and the synthesis of data from the conventional No. 1 KB/MS interface is carried out, data from the display device 5 can be used without depending on the application software of the external computer.

Fourthly since the internal screen of the display device 5 may be automatically matched with the window screen of the external computer 6 by taking window information from the external computer 6 into the display device 5, the display from all external computers may be used directly.

Fifthly, there is the advantage that the window size and location, the synthesis mode and the screen display priority level may be freely changed by the screen control menu of the display device 5.

Sixthly, since the video interface of the display device 5 may have a built-in horizontal/vertical auto scanner circuit, various external devices other than the external computer 6, can easily be connected to the display device 5.

Seventhly, since video signals from the external computer 6 may be stored in the frame memory 47 of the display device 5, the video data can be processed in the display device 5 in various ways.

Eighthly, since the display device 5 may contain an IC memory card, various files can be stored in this card.

Ninthly, since handwritten data in the display device 5 is simultaneously inputted into the external computer 6 as an external device through the code interface, handwriting can be displayed on the display of the external computer 6 in real time. Accordingly, the display of the external computer 6 can correspond to the display of the character input sheet, which enables early discovery of misoperations and provides psychological relief with the displayed input process.

Figure 46:
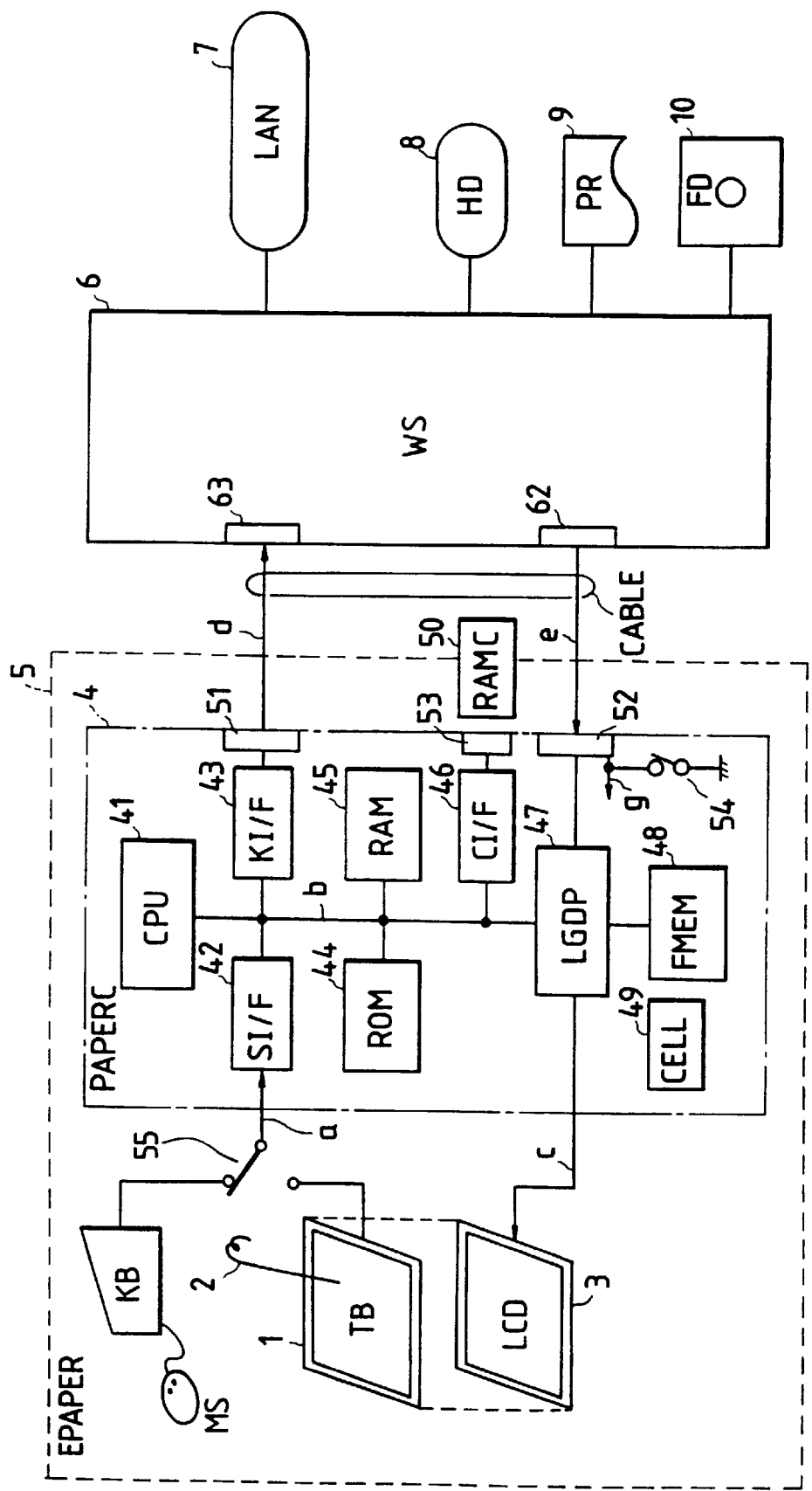
FIG. 46 shows another embodiment of the present invention.

FIG. 46 shows another embodiment of the interface between a display device 5 and an external computer 6 in which it is possible to connect he code interface signal line d to the KB/MS interface terminal 63 of the external computer 6. FIG. 45 requires two code interfaces, however FIG. 46 needs only one interface. Special attention must be paid to the protocol of the code interface, because mouse data can only be handled in the form of relative coordinates (coordinates of variations) in the conventional KB/MS protocol. Since however, the touch pad 1 can only input absolute coordinates of a screen, it is necessary to have the protocol define this correspondence.

Stroke inputting is impractical for inputting a large volume of numerical data. This problem can be solved by providing the electronic paper system with a switch 55 for switching between a keyboard/mouse (KB/MS) unit and the touch pad 1. A trigger for changing can easily be achieved by providing a menu on the screen of the display device 5. In FIG. 46, the image of a palm-top computer, rather than electronic paper, is created by changing over the switch 55 to the keyboard/mouse side. Therefore,the present invention is able to apply similar concepts to ordinary personal computers if they have a video interface and a code interface. Apart from the connection to the keyboard/mouse unit the embodiment of the present invention shown in FIG. 46 is generally similar to the embodiment of FIG. 1. Corresponding parts are indicated by the same reference numerals.

In the embodiment of the present invention shown in FIGS. 11 and 12 handwriting display data of the character input sheet is simultaneously transferred and displayed on the screen of the external computer 6 through the code interface. In another embodiment, handwriting data may not be transferred to the external computer 6.

FIGS. 47 through 51 show configurations of further embodiments.

Figure 47:
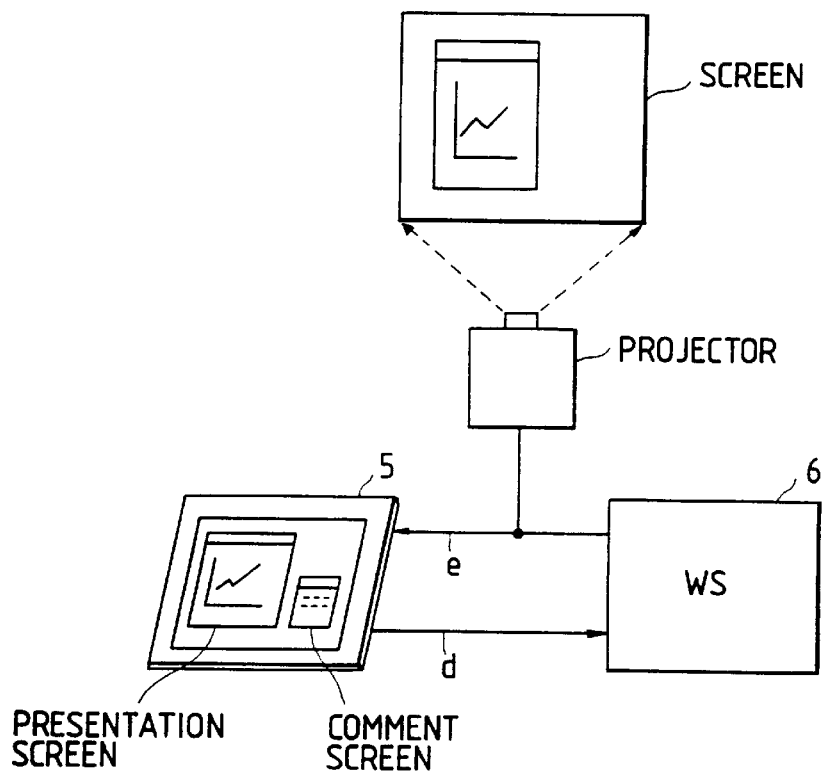
FIG. 47 shows a third embodiment of the present invention.
Figure 48:
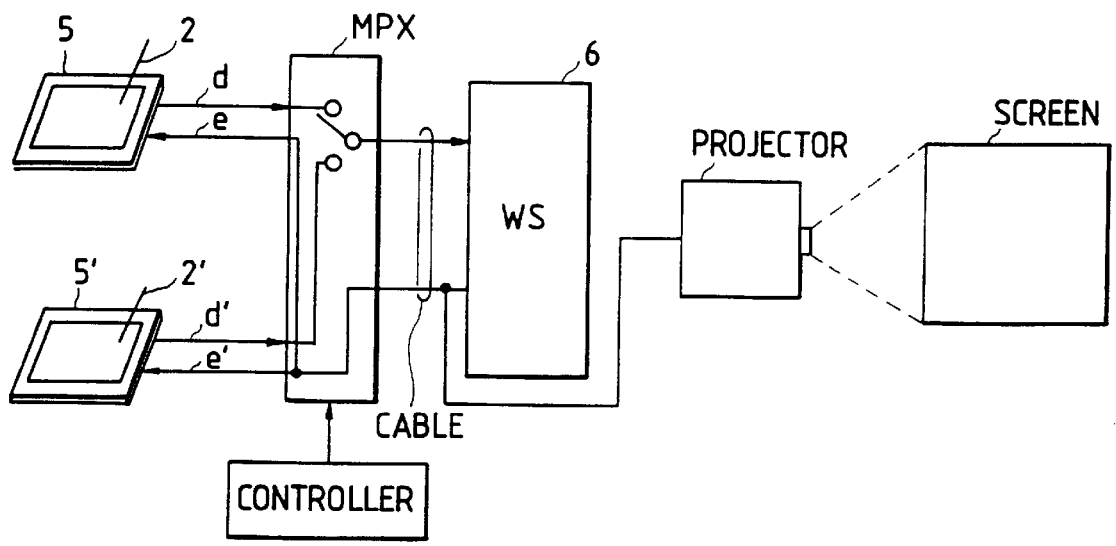
FIG. 48 shows a fourth embodiment of the present invention.

FIG. 47 shows the application of the present invention to a presentation system, in which a large-screen projector is connected to video signal line e and a presentation screen and a comment screen are simultaneously displayed on the display 3 of the display device 5 to facilitate presentation. If required, the comment screen can be displayed on the screen from the projector by using the screen transfer menu in the aforesaid file manipulation menu. Additionally, for a meeting involving many people. it is possible to connect the code interface signal line d to the presentation system for many people through a multiplexer (MPX) as shown in FIG. 48. The multiplexer is operated by the leader of the meeting through a controller (CONTROLLER).

Figure 49:
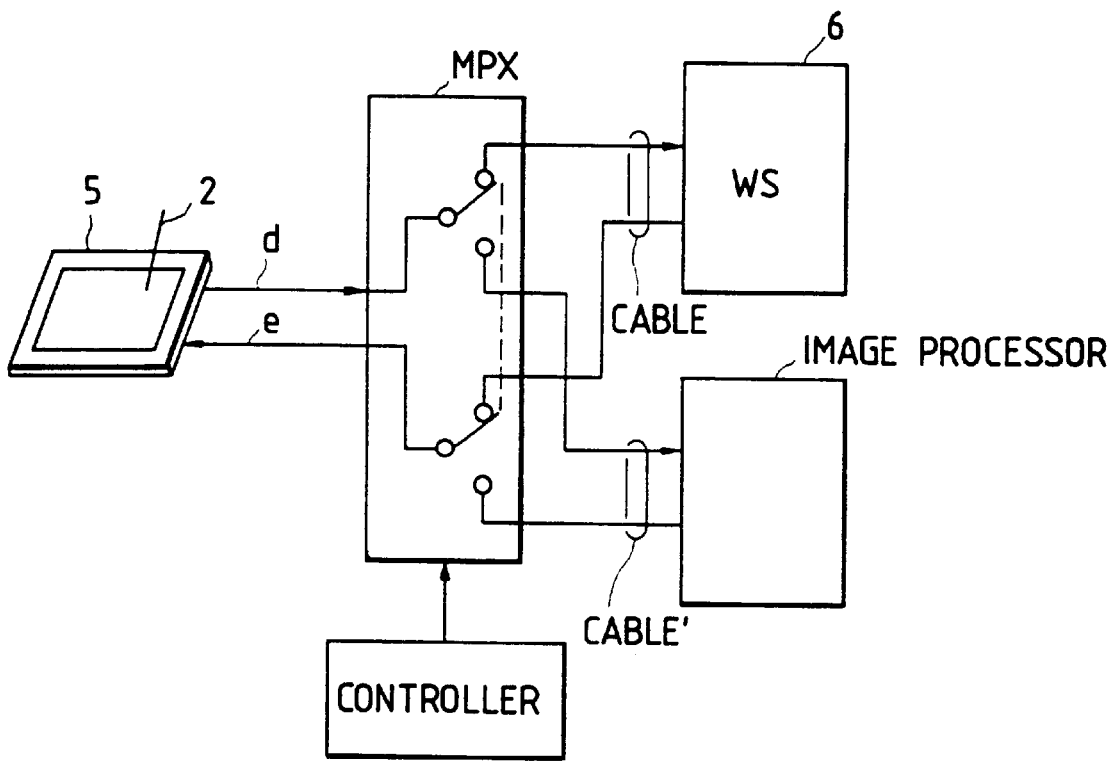
FIG. 49 shows a fifth embodiment of the present invention.

FIG. 49 illustrates a system configuration in which one electronic paper display device is interfaced through a multiplexer with two external devices, for example, the external computer 6 and an image processor. With this configuration, it is easy to change between one external device and the other, and at the same time it is possible to operate these external devices with one display device 5, improving performance.

Figure 50:
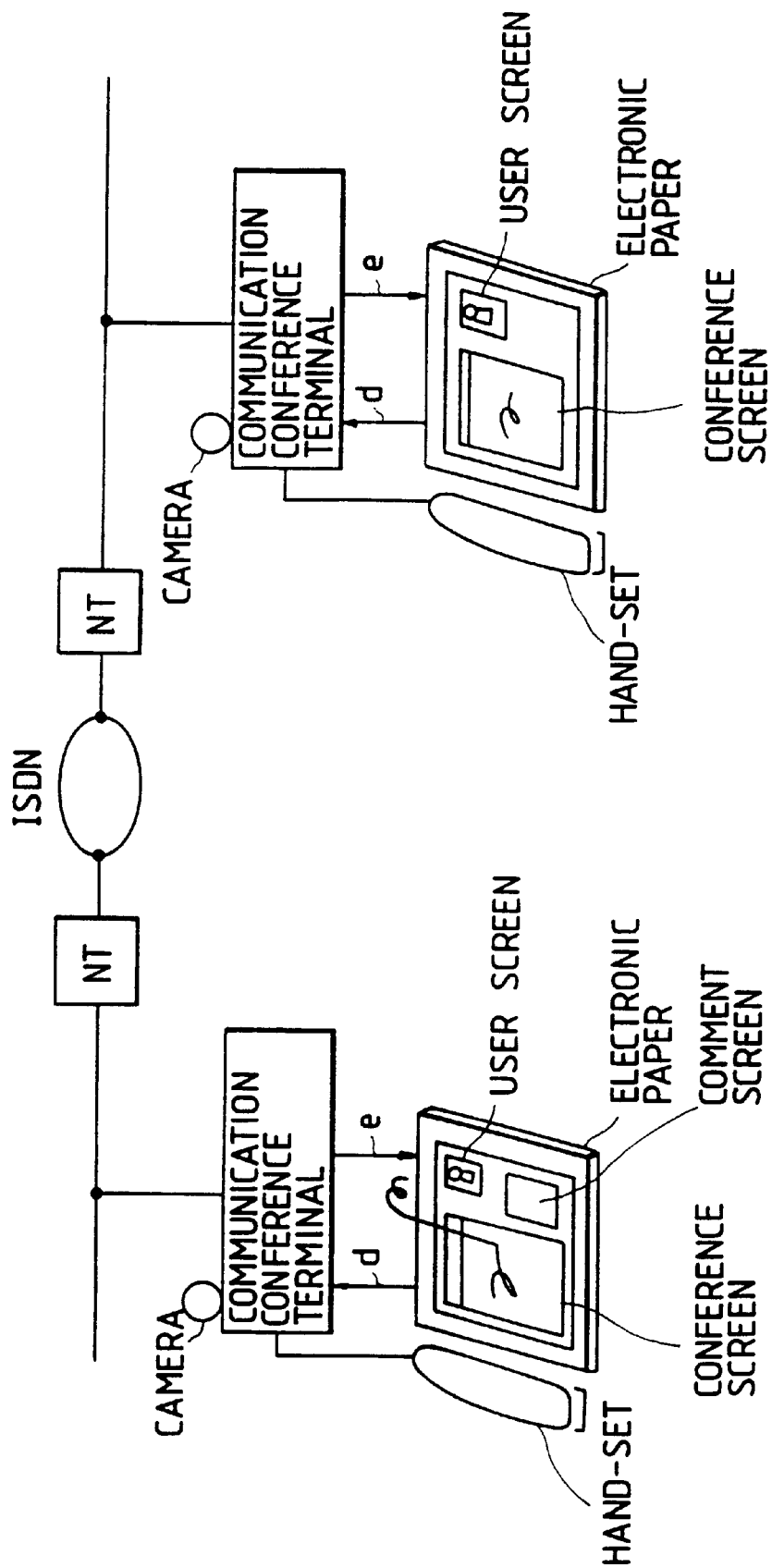
FIG. 50 shows a sixth embodiment of the present invention.

FIG. 50 shows the application of the present invention to a communication conference terminal system of an Integrated Service Digital Network (ISDN).

In FIG. 50, a communication conference terminal system is formed by a mainframe computer, a camera, a hand set and an electronic paper display device according to the present invention. Since this application enables the coexistance of the facility of a communication conference terminal and the facility of electronic paper, various application styles can be considered. For example, remote CAI (computer-aided instruction), remote data base access terminals and remote diagnostic terminals (medical) may be provided.

Figure 51:
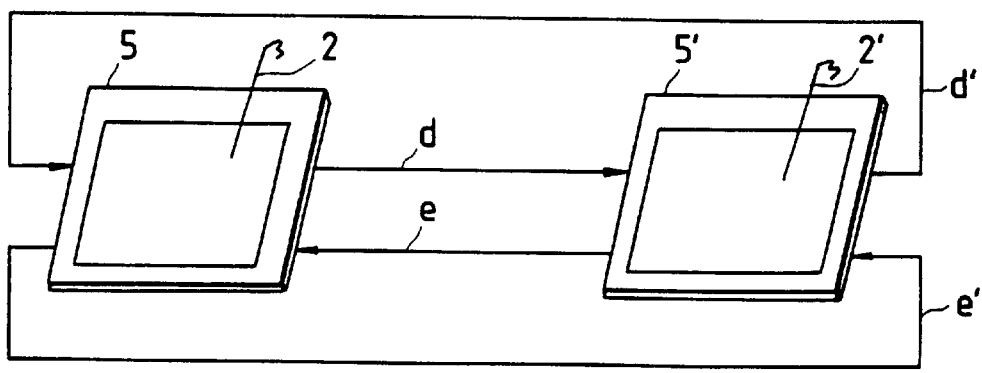
FIG. 51 shows a seventh embodiment of the present invention.

FIG. 51 illustrates a configuration in which more than one display device 5, 5' according to the present invention are mutually connected through the video interface and the code interface thereof. The signal on the video interface line e in this case is the same as that of the line c in FIG. 3.

In the embodiment shown in FIG. 51, since video data of both display devices are inputted, handwriting data inputted to the display device 5 by the stylus 2 is immediately transmitted to the screen of the other display device 5'. This enables inputting into the same display by several people on a real time basis, producing good interaction.

Similar effects are obtainable from easy connections to other external systems, such as personal computers, word processors, television systems and image processing systems, as long as they deal with video signals.

According to the present invention, since the screen of an external device can be synthesized and displayed on the screen of a hand-writing input/output display device, and also because the hand-writing input/output display device controls windows of its display, two working environments can coexist on the same display. Therefore, because of good work efficiency and the usability of high functions of a hand-writing input/output display device, the present invention can provide a handwriting input/output display device and a hand-writing input system using such a device, which have improved expandability and connectability not only for personal use, but also for business.

What is claimed is:

1. An electronic device comprising:

a display unit for displaying video data which is input through an image input unit;

a coordinate input unit for inputting hand-written data to said display unit, wherein said display unit and said coordinate input unit are integrated;

a common frame memory which stores the video data input from the image input unit and the handwritten data input from said coordinate input unit;

a memory interface which controls timings of reading and writing of the video data and the handwritten data for said common frame memory; and a processor which writes the video data and the handwritten data read from said common frame memory through said memory interface, synthesizes the written video data and the handwritten data, reads the synthesized video data and handwritten data as display data, and outputs the read display data to said display unit, wherein said common frame memory, said memory interface and said processor are formed on a single semiconductor substrate.

2. An electronic system comprising:

a display unit for displaying video data which is input through an image input unit;

a coordinate input unit for inputting hand-written data to said display unit, wherein said display unit and said coordinate input unit are integrated;

a printing machine for printing data;

a common frame memory which stores the video data inputted from the image input unit and the handwritten data input from said coordinate input unit;

a memory interface which controls timings of reading and writing of the video data and the handwritten data for said common frame memory; and a processor which writes the video data and the handwritten data read from said common frame memory through said memory interface, synthesizes the written video data and the handwritten data, reads the synthesized video data and handwritten data, and outputs the read synthesized data to said printing machine.

3. An electronic system comprising:

a display unit for displaying video data which is input through an image input unit; and a coordinate input unit for inputting hand-written data to said display unit, wherein said display unit and said coordinate input unit are integrated;

an external file device for storing data;

a common frame memory which stores the video data input from the image input unit and the handwritten data input from said coordinate input unit;

a memory interface which controls timings of reading and writing of the video data and the handwritten data for said common frame memory; and a processor which writes the video data and the handwritten data read from said common frame memory through said memory interface, synthesizes the written video data and the handwritten data, reads the synthesized video data and handwritten data, and outputs the read synthesized data to said external file device.

* * * * *